US012687459B2

(12) United States Patent
Chen et al.

(10) Patent No.: US 12,687,459 B2
(45) Date of Patent: Jul. 21, 2026

(54) METHOD AND APPARATUS OF SINGLE-ENDED POLARIZATION MODE DISPERSION MEASUREMENT

(71) Applicant: EXFO Inc., Quebec (CA)

(72) Inventors: Hongxin Chen, Montreal (CA); Yves Breton, Quebec (CA); Mathieu Huneault, Quebec (CA)

(73) Assignee: EXFO Inc., Quebec (CA)

( * ) Notice: Subject to any disclaimer, the term of this patent is extended or adjusted under 35 U.S.C. 154(b) by 122 days.

(21) Appl. No.: 18/773,248

(22) Filed: Jul. 15, 2024

(65) Prior Publication Data

US 2025/0035510 A1      Jan. 30, 2025

Related U.S. Application Data

(60) Provisional application No. 63/661,729, filed on Jun. 19, 2024, provisional application No. 63/516,162, filed on Jul. 28, 2023.

(51) Int. Cl.
G01M 11/00 (2006.01)
(52) U.S. Cl.
CPC .... *G01M 11/3163* (2013.01); *G01M 11/3127* (2013.01); *G01M 11/3145* (2013.01); *G01M 11/3181* (2013.01)
(58) Field of Classification Search
CPC ......... G01M 11/3163; G01M 11/3145; G01M 11/3181; G01M 11/3127
See application file for complete search history.

(56) References Cited

U.S. PATENT DOCUMENTS 7,920,253 B2    4/2011   Cyr et al.
9,829,429 B2    11/2017  Cyr et al.
(Continued)

FOREIGN PATENT DOCUMENTS

TW        201427303 A  *  7/2014
WO        2008116314 A1    10/2008

OTHER PUBLICATIONS

C.D. Poole, D.L. Favin, 'Polarization-mode dispersion measurements based on transmission spectra through a polarizer', Journal of Lightwave Technology, vol. 12 (6), pp. 917-929 (1994).
(Continued)

*Primary Examiner* — Tarifur R Chowdhury
*Assistant Examiner* — Kaitlyn E Kidwell
(74) *Attorney, Agent, or Firm* — Helene Chotard

(57)            ABSTRACT
A method and system of measuring the PMD of an optical fiber under test (FUT). A polarization-sensitive optical time domain reflectometer (POTDR) is used to inject into the FUT and from a proximal end thereof, a test signal comprising a series of repeated light pulses and detecting a corresponding polarization-analyzed return light signal coming back from the optical fiber and representing back-reflected light from a light reflector connected to a distal end of the FUT. The plurality of polarization-sensitive acquisitions defines at least one pair of acquisitions performed with mutually different but closely-spaced wavelengths and substantially the same state of polarization (SOP). The process may be repeated for a plurality of pairs of acquisitions performed with at least one of a plurality of mutually-different center wavelengths and a plurality of mutually-different SOPs, and a value of the PMD for the FUT is calculated therefrom.

22 Claims, 11 Drawing Sheets

(56)            References Cited

U.S. PATENT DOCUMENTS

2009/0244522 A1 * 10/2009 Cyr ................... G01M 11/3181
                                                    356/73.1
2016/0161397 A9 *  6/2016 Cyr ................... G01M 11/3163
                                                    356/73.1

OTHER PUBLICATIONS

N. Cyr, 'Polarization-mode dispersion measurement: generalization of the interferometric method to any coupling regime', Journal of Lightwave Technology, vol. 22(3), pp. 794-805 (2004).

F. Corsi, A. Galtarossa, L. Palmieri, M. Schiano, T. Tambosso, "Continuous-Wave Backreflection Measurement of Polarization Mode Dispersion", IEEE Photonics Technology Letters, vol. 11 No. 4, Apr. 1999, pp. 451-453.

A. Galtarossa, L. Palmieri, M. Schiano, T. Tambosso, "Single-End Polarization Mode Dispersion Measurement Using Backreflected Spectra Through a Linear Polarizer", IEEE/OSA J. Lightwave Technology, vol. 17 No. 10, Oct. 1999, pp. 1835-1842.

H. Sunnerud, B.-E. Olsson, M. Karlsson, P. A. Andrekson, J. Brentel "Polarization-Mode Dispersion Measurements Along Installed Optical Fibers Using Gated Backscattered Light and a Polarimeter", Journal of Lightwave Technology, vol. 18 (7), pp. 897-904 (2000).

B. Huttner, B. Gisin, N. Gisin, "Distributed PMD measurement with a polarization-OTDR in optical fibers", Journal of Lightwave Technology, vol. 17(10), pp. 1843-1948, Oct. 1999.

* cited by examiner

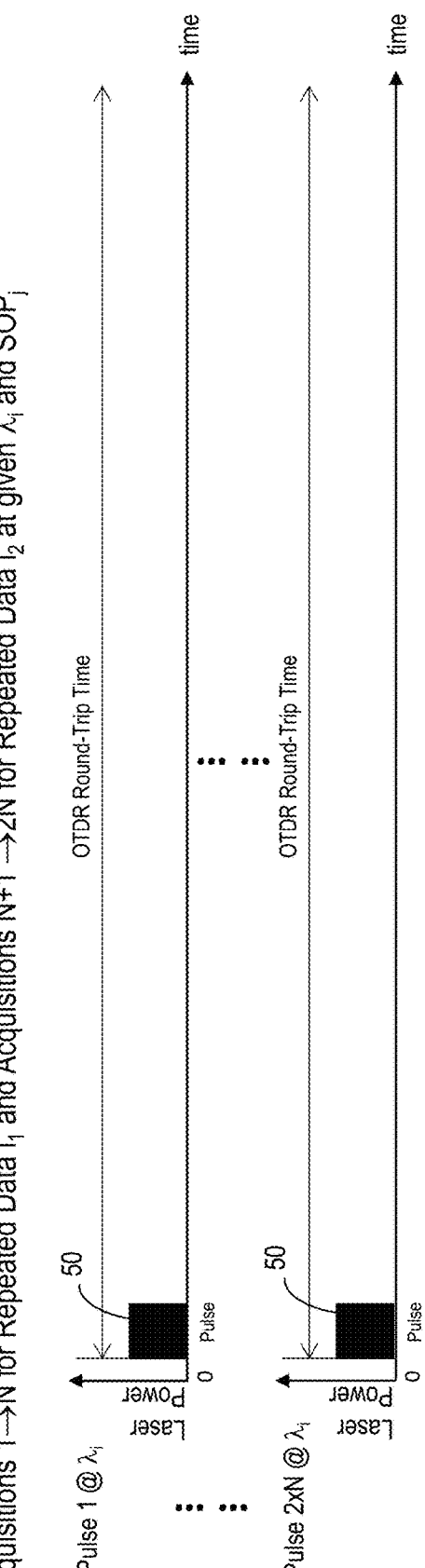
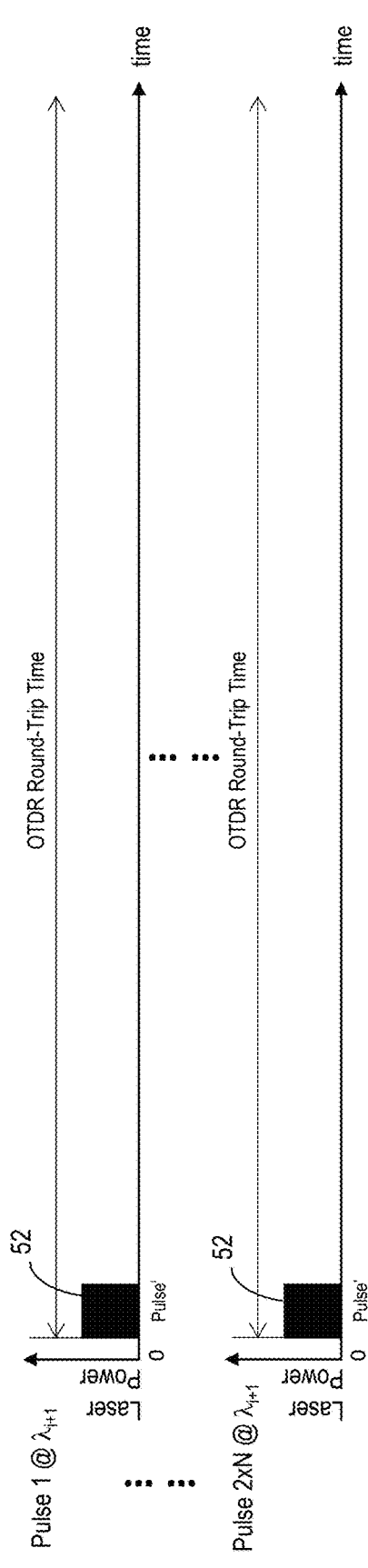
FIG. 2

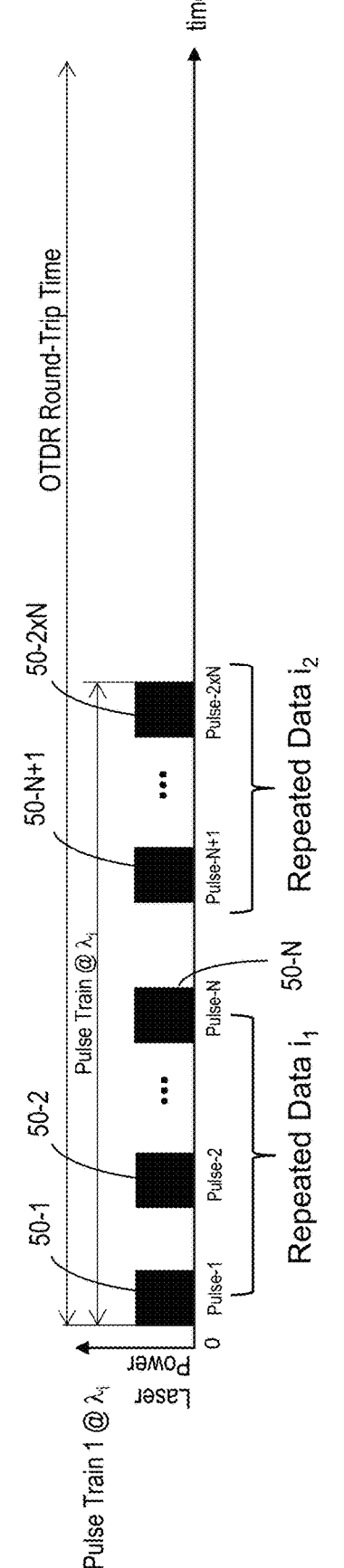
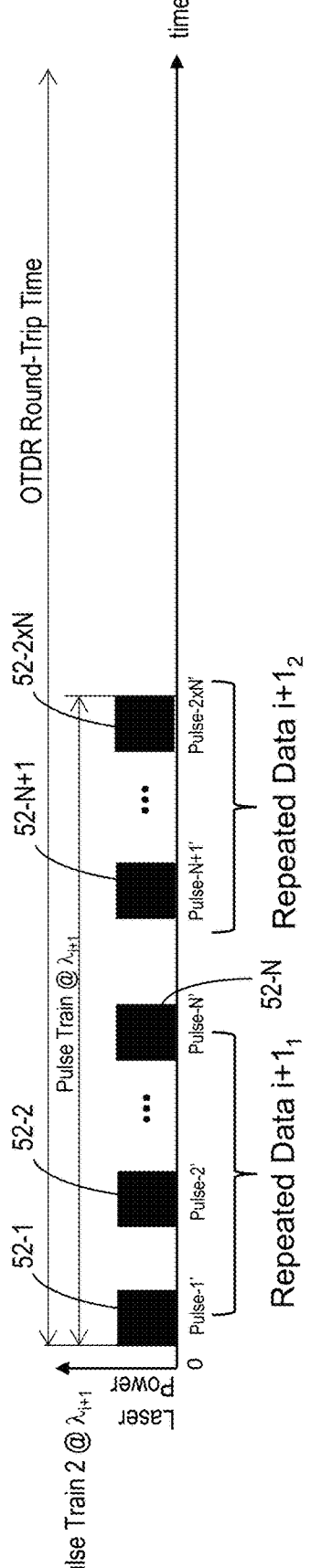
FIG. 3

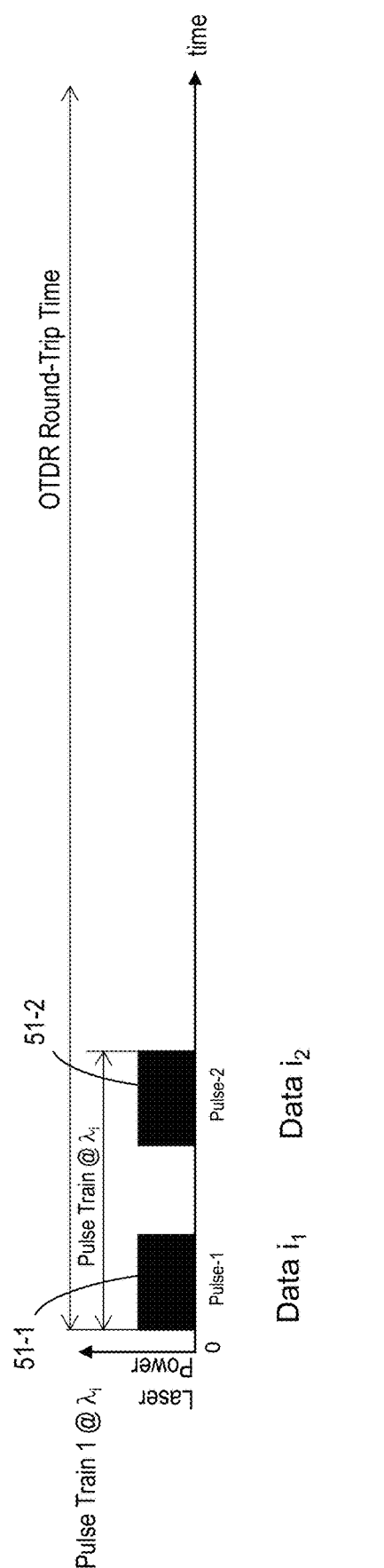
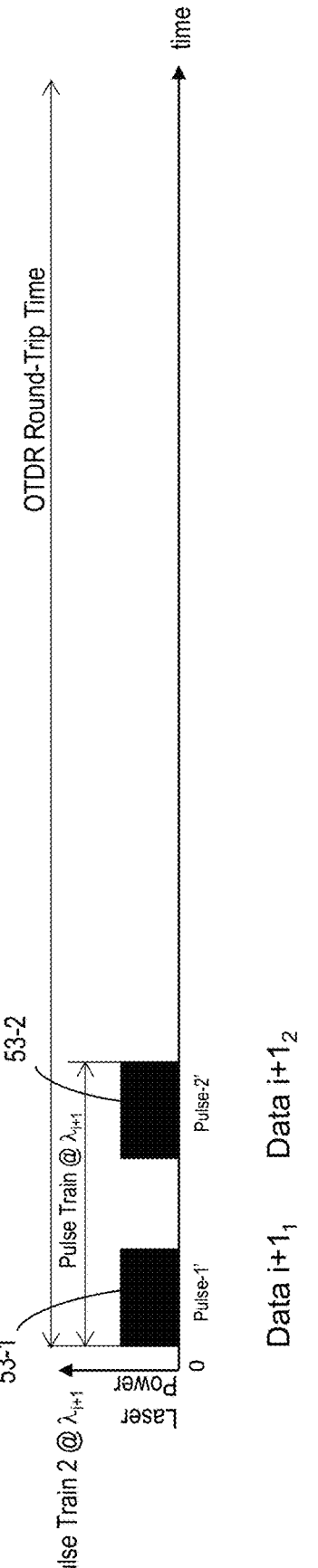
FIG. 5

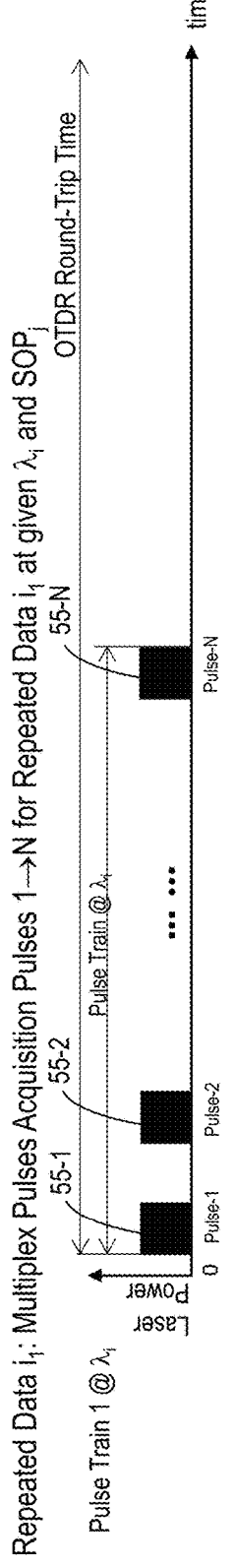

Repeated Data $i_1$: Multiplex Pulses Acquisition Pulses 1→N for Repeated Data $i_1$ at given $\lambda_i$ and $SOP_j$

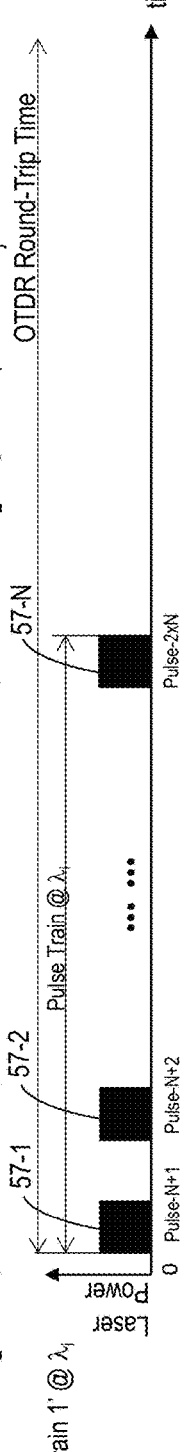

Repeated Data $i_2$: Multiplex Pulses Acquisition Pulses N+1→2N for Repeated Data $i_2$ at given $\lambda_i$ and $SOP_j$

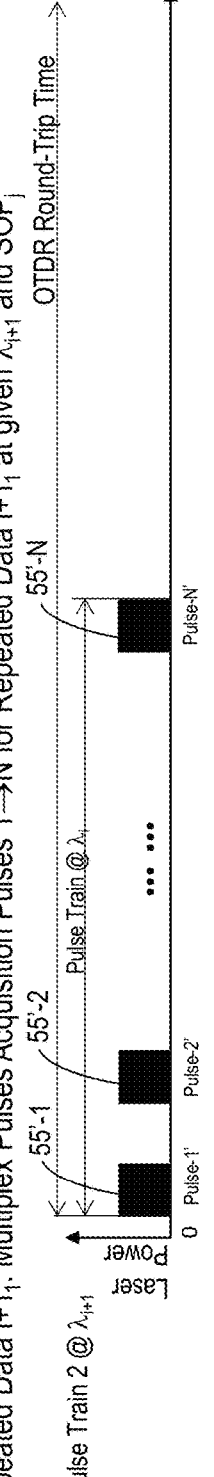

Repeated Data i+1$_1$: Multiplex Pulses Acquisition Pulses 1→N for Repeated Data i+1$_1$ at given $\lambda_{i+1}$ and $SOP_j$

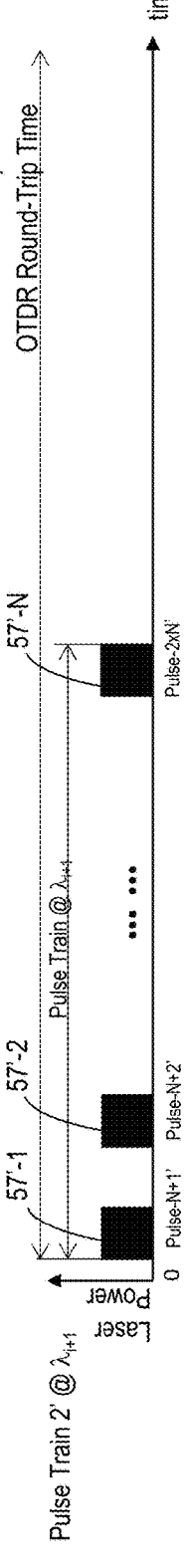

Repeated Data i+1$_2$: Multiplex Pulses Acquisition Pulses N+1→2N for Repeated Data i+1$_2$ at given $\lambda_{i+1}$ and $SOP_j$

FIG. 6

METHOD AND APPARATUS OF SINGLE-ENDED POLARIZATION MODE DISPERSION MEASUREMENT

TECHNICAL FIELD

The present description generally relates to Polarization Mode Dispersion (PMD) measurement, and more particularly to single-ended PMD measurement in optical fiber links or devices.

BACKGROUND

Polarization Mode Dispersion (PMD) is a polarization-related physical phenomenon that often limits the bandwidth-distance product of a fiber-optic-based telecommunication link. In other words, PMD may be the primary impairment limiting the reach (i.e. maximum propagation distance) of high bit-rate or high symbol-rate signals. PMD may limit the bandwidth that may be carried in a single optical channel along a "long-haul" (i.e. long-distance) optical link. Thus, it is desirable to be able to characterize one or more PMD-related parameters of an optical link or of an optical path which forms part thereof.

Some prior art approaches for the measurement of the overall PMD of an optical link usually involve launching polarized light from a test source into one end of the Fiber Under Test (FUT), detecting and analyzing light exiting the FUT on the other end, and deducing the PMD therefrom using suitable analysis (see, e.g., Poole et al., "Polarization-mode dispersion measurements based on transmission spectra through a polarizer", Journal of Lightwave Technology, Vol. 12 (6), pp. 917-929 (1994); and Cyr, "Polarization-mode dispersion measurement: generalization of the interferometric method to any coupling regime", Journal of Lightwave Technology, Vol. 22 (3), pp. 794-805 (2004)). However, there are significant additional operational costs involved with placing a dedicated source at one end and the measurement equipment at the other ("two-ended" approaches), in addition to the difficulties often associated with providing regular communication between the equipment placed at the opposite ends.

Some other prior art PMD measurement approaches are based on a single-ended (also called "one-ended") measurement and involve launching a polarized light pulse from a test source and detecting and analyzing the light pulse as returned from the FUT at the same end of the FUT (see, e.g., Corsi et al., "Continuous-Wave Backreflection Measurement of Polarization Mode Dispersion Characterization", IEEE Photonics Technology Letters, Vol. 11 No. 4, April 1999, pp. 451-453; Galtarossa et al., "Single-End Polarization Mode Dispersion Measurement Using Backreflected Spectra Through a Linear Polarizer", IEEE/OSA J. Lightwave Technology, Vol. 17 No. 10, October 1999, pp. 1835-1842; Sunnerud et al., "Polarization-Mode Dispersion Measurements Along Installed Optical Fibers Using Gated Backscattered Light and a Polarimeter", Journal of Lightwave Technology, Vol. 18, No. 7, pp. 897-904, July 2000; and Huttner et al., "Distributed PMD measurement with a polarization-OTDR in optical fibers", Journal of Lightwave Technology, Vol. 17, pp. 1843-1948 October 1999).

U.S. Pat. No. 7,920,253 to Cyr et al. also describes a single-ended (or "one-ended") PMD measurement method which deduces the PMD using the Scrambled State of Polarization Analysis method (referred to herein as the "SSA method") and a light reflector connected at the far end of the FUT (such as either a fiber mirror or a UPC or PC end connector). The measurement method uses repeated polarization-sensitive OTDR (POTDR) measurements with a polarized pulsed OTDR light source. POTDR acquisitions are performed for at least two wavelengths, wherein each POTDR acquisition involves performing multiple acquisitions and averaging the results. A single pulse is launched at a time and the system waits for the pulse to perform a round-trip in the FUT before sending another pulse. The PMD value is obtained based on an RMS value calculated from the POTDR acquisitions. The POTDR detection electronics measures the back-reflection of the light pulse from the light reflector connected at the far end of the FUT. Such a single-ended PMD measurement has the significant disadvantage of necessitating a long averaging time required for averaging many acquisitions (in order to reduce the noise inherent to OTDR acquisitions). Some two-ended solutions which perform end-to-end measurement (instead of single-end) are a lot faster.

There therefore remains a need for an improved single-ended PMD measurement method with a significantly reduced acquisition time so as to decrease the PMD measurement time.

SUMMARY

The present invention seeks to eliminate, or at least mitigate, the disadvantages of the prior art discussed above, or at least provide an alternative.

In accordance with one aspect, there is provided an improved method for measuring the Polarization Mode Dispersion (PMD), which allows to improve the dynamic range vs the acquisition time, e.g., reach more dynamic range for the same acquisition time or to reduce the acquisition time vs the dynamic range, i.e., use less acquisition time for the same dynamic range.

In accordance with one aspect, there is provided a method of measuring the PMD of the optical Fiber Under Test (FUT) (also referred to herein sometimes as the optical fiber Device Under Test (DUT)). A polarization-sensitive optical time domain reflectometer (POTDR) is used to inject into the FUT and from a proximal end thereof, a test signal comprising repeated light pulses and detecting a corresponding polarization-analyzed return light signal coming back from the optical fiber and representing back-reflected light from a light reflector connected to a distal end of the FUT (such as, e.g., a UPC connector or fiber mirror), said return light signal comprising repeated reflected light pulses, wherein the repeated light pulses comprise a plurality of pulses within one round-trip time of the FUT. The plurality of polarization-sensitive acquisitions defines at least one pair of acquisitions performed with mutually different but closely-spaced wavelengths and substantially the same state of polarization (SOP), a center of said wavelengths defining a center wavelength for said at least one pair. The process may be repeated for a plurality of pairs of acquisitions performed with at least one of a plurality of mutually-different center wavelengths and a plurality of mutually-different states of polarization (SOP). For each said acquisitions, respective amplitudes of the repeated reflected light pulses are average so as to obtain an averaged reflected power. The PMD is obtained by, for each said pairs of said acquisitions, computing a value of a difference between the two averaged reflected powers corresponding to said pair, followed by the mean-square value of computed values of difference over said at least one of a plurality of mutually-different center wavelengths and a plurality of mutually-different states of polarizations (SOPs) and, from said mean-square value, calculating a value of the PMD for the optical fiber under test.

It is noted that when referring to averaging respective amplitudes of the repeated reflected light pulses, the averaging may be performed over at least some or all of the repeated reflected light pulses, so as to obtain an averaged reflected power.

In accordance with another aspect, there is provided a method for measuring a polarization mode dispersion (PMD) to characterize an optical fiber under test, the method comprising:

from a proximal end of the optical fiber under test which distal end is connected to a light reflector, performing a plurality of polarization-sensitive acquisitions using a polarization-sensitive Optical Time Domain Reflectometer (POTDR), wherein each acquisition is performed by propagating in the optical fiber under test, a polarized test signal comprising a first series of repeated light pulses and detecting a corresponding polarization-analyzed return light signal coming back from the optical fiber under test and comprising back-reflected light from the light reflector, said return light signal comprising repeated reflected light pulses;

wherein each of said acquisitions is performed with a corresponding wavelength of said test signal, wherein said plurality of polarization-sensitive acquisitions defines at least one pair of acquisitions performed with mutually different but closely-spaced wavelengths and substantially the same state of polarization (SOP), a center of the wavelengths defining a center wavelength for said at least one pair, and wherein said plurality of polarization-sensitive acquisitions comprises a plurality of pairs of acquisitions performed with at least one of a plurality of mutually-different center wavelengths and a plurality of mutually-different states of polarization (SOP); and for each said acquisitions, averaging respective amplitudes of at least part of said repeated reflected light pulses to obtain a value of reflected power;

for each said pairs of said acquisitions, computing a value of a difference, between the two values of reflected powers corresponding to said pair;

computing a mean-square value of the computed values of difference over said at least one of a plurality of mutually-different center wavelengths and a plurality of mutually-different states of polarizations (SOPs); and from said mean-square value, calculating a value of the polarization mode dispersion of said optical fiber under test.

In some implementations, said value of reflected power is obtained by averaging respective amplitudes of all of said repeated reflected light pulses.

In some implementations, each of said acquisitions comprises the propagation of said first series of repeated light pulses and a second series of repeated light pulses, wherein the second series is propagated before detection of the return light signal of the first series. In some other implementations, each acquisitions comprises the propagation of a first series of repeated light pulses and a second series of repeated light pulses, wherein the second series is propagated after detection of the return light signal of the first series. The method may then further comprise: normalizing each said value of reflected power before said computing a value of a difference, wherein said normalizing comprises averaging said values of reflected power obtained for said first and said second series of repeated light pulses and dividing each value of reflected power by the average value of reflected power. In some implementations, said first and second series may comprise 4 to 100 light pulses.

In some implementations, said computing a value of a difference comprises computing a second-order joint moment of the difference.

In some implementations, said averaging respective amplitudes of said repeated reflected light pulses comprises rearranging a timing of each pulse of the series of repeated light pulses in the return light signal and averaging the rearranged return light signal to obtain a value of reflected power.

In some implementations, said value of the polarization mode dispersion is calculated as a predetermined function of said mean-square value.

In some implementations, said plurality of polarization-sensitive acquisitions comprises a plurality of pairs of acquisitions performed a plurality of mutually-different center wavelengths, wherein said plurality of mutually-different center wavelengths is obtained by tuning a laser wavelength of said POTDR in steps between acquisitions.

In some other implementations, said plurality of polarization-sensitive acquisitions comprises a plurality of pairs of acquisitions performed a plurality of mutually-different center wavelengths, wherein said plurality of mutually-different center wavelengths is obtained by tuning a laser wavelength of said POTDR in continuous.

In accordance with another aspect, there is provided a system for measuring a polarization mode dispersion (PMD) to characterize an optical fiber under test, the system comprising:

a polarization-sensitive Optical Time Domain Reflectometer (POTDR) acquisition device connectable toward a proximal end of the optical fiber under test for performing a plurality of polarization-sensitive acquisitions toward the optical fiber under test, a distal end of said optical fiber under test being connected to a light reflector, wherein said POTR acquisition device is configured so that:

each acquisition is performed by propagating in the optical fiber under test, a polarized test signal comprising a first series of repeated light pulses and detecting a corresponding polarization-analyzed return light signal coming back from the optical fiber under test and comprising back-reflected light from the light reflector, said return light signal comprising repeated reflected light pulses, each of said acquisitions is performed with a corresponding wavelength of said test signal, said plurality of polarization-sensitive acquisitions defines at least one pair of acquisitions performed with mutually different but closely-spaced wavelengths and substantially the same state of polarization (SOP), a center of the wavelengths defining a center wavelength for said at least one pair, and said plurality of polarization-sensitive acquisitions comprises a plurality of pairs of acquisitions performed with at least one of a plurality of mutually-different center wavelengths and a plurality of mutually-different states of polarization (SOP); and a processing unit receiving acquisition data and configured for:

for each said acquisitions, averaging respective amplitudes of at least part of said repeated reflected light pulses to obtain a value of reflected power, for each said pairs of said acquisitions, computing a value of a difference, between the two values of reflected powers corresponding to said pair, computing a mean-square value of the computed values of difference over said at least one of a plurality of mutually-different center wavelengths and a plurality of mutually-different states of polarizations (SOPs); and from said mean-square value, calculating a value of the polarization mode dispersion of said optical fiber under test.

In some implementations, said POTDR acquisition device comprises a light generating assembly comprising a tunable light source and pulse generator and configured to generate said test signal comprising repeated light pulses, at said mutually different wavelengths.

In some implementations, said POTDR acquisition device comprises a light detecting assembly comprising at least one detector configured to detect said return light signal returning from said optical fiber under test from said test signal for each of said acquisitions.

In some implementations, said POTDR acquisition device comprises a polarization-controller-and-analyzer unit comprising a polarization discriminator, a polarization controller used to control both an input state of polarization and an analyzer state of polarization.

In some implementations, said POTDR acquisition device is configured such that each of said acquisitions comprises the propagation of a first series of repeated light pulses and a second series of repeated light pulses, wherein the second series is propagated after detection of the return light signal of the first series. In some other implementations, said POTDR acquisition device is configured such that each acquisitions comprises the propagation of a first series of repeated light pulses and a second series of repeated light pulses, wherein the second series is propagated before detection of the return light signal of the first series. Said processing unit may then be further configured for: normalizing each said value of reflected power before said computing a value of a difference, wherein said normalizing comprises averaging said values of reflected power obtained for said first and said second series of repeated light pulses and dividing each value of reflected power by the average value of reflected power In some implementations, said averaging respective amplitudes of said repeated reflected light pulses comprises rearranging a timing of each pulse of the series of repeated light pulses in the return light signal and averaging the rearranged return light signal to obtain a value of reflected power.

In some implementations, wherein said processing unit is configured for calculating said value of the polarization mode dispersion as a predetermined function of said mean-square value.

In some implementations, said plurality of polarization-sensitive acquisitions comprises a plurality of pairs of acquisitions performed with a plurality of mutually-different center wavelengths and wherein said tunable light source is configured for tuning a laser wavelength of said POTDR in steps between acquisitions to obtain said plurality of mutually-different center wavelengths.

In some other implementations, said plurality of polarization-sensitive acquisitions comprises a plurality of pairs of acquisitions performed with a plurality of mutually-different center wavelengths and wherein said tunable light source is configured for tuning a laser wavelength of said POTDR in continuous between acquisitions to obtain said plurality of mutually-different center wavelengths.

In some embodiments, two series of repeated pulse test signals are sent one after another, e.g. with a time delay from <10 ns to over 2000 ns, at first given wavelength into the FUT, i.e., two series of repeated pulses are incident into the FUT with a short time difference, e.g., of 10 ns to 2000 ns, and having same first wavelength or negligible wavelength difference from the first wavelength, to form two series of back-reflections corresponding to the two series of repeated pulse test signals so having different noise characteristics, then is to repeat this process but at second wavelength for the single-ended PMD measurement.

In some embodiments, the process is repeated for at least a plurality of wavelength pairs to cross a wavelength range, e.g., between 1450 nm and 1650 nm or any other wavelength ranges between 1250 nm and 1650 nm.

In some embodiments, the return light signal for each acquisition is normalized before computing a value of a difference between two averaged reflected powers.

In some embodiments, each acquisitions comprises the propagation of a first series of repeated light pulses and a second series of repeated light pulses, wherein the second series is propagated before detection of the return light signal of the first series, such that a total length of the first and the second series is less than a round-trip time in the FUT.

In other words, each of the first series of repeated light pulses and the second series of repeated light comprises a plurality of pulses within one round-trip time of the FUT.

In some embodiments, a first series of repeated light pulses and a second series of repeated light pulses are sent together at a first wavelength and then another first series of repeated light pulses and another second series of repeated light pulses are sent together but at a second wavelength into the FUT, wherein the repeated light pulses at first and/or second wavelengths may have either even time separations or not even time separations.

In some embodiments, for example, each series of light pulses may comprise about 4 to 100 light pulses so as to obtain a signal to noise ratio greater than about 6 to 20 dB.

In some embodiments, a wavelength range, e.g., between 1450 nm and 1650 nm or any other wavelength ranges between 1250 nm and 1650 nm, may be obtained by tuning a laser wavelength in step by step i.e. step tuning laser wavelength from low wavelength to high, e.g., from wavelength 1450 nm and 1650 nm, or high wavelength to low, e.g., from wavelength 1650 nm and 1450 nm, wherein each pulse within a same series of repeated light pulses has the same wavelength or a negligible laser frequency difference compared with mutually different wavelengths of one pair of acquisitions.

In some other embodiments, a wavelength range, e.g., between 1450 nm and 1650 nm or any other wavelength ranges between 1250 nm and 1650 nm, may be obtained by a continuous tuning of a laser wavelength, i.e., continuously tuning laser wavelength from low wavelength to high, e.g., from wavelength 1450 nm and 1650 nm, or high wavelength to low, e.g., from wavelength 1650 nm and 1450 nm, wherein the tuning speed, e.g., 2 to 100 nm/s, is selected so that a same series of repeated light pulses has the same wavelength or a negligible laser wavelength difference compared with mutually different wavelengths of one pair of acquisitions.

In accordance with another aspect, there is provided a method of measuring a polarization-related characteristic of an optical path wherein light comprising polarized light is propagated, the method comprising the steps of using:

polarization-controller-and-analyzer means connected to the optical path at or adjacent either the proximal end thereof or a distal end thereof to control at least one of state of polarization (I-SOP) of light launched in the optical path and state of polarization (A-SOP) used to analyze light leaving the optical path, detecting means to detect the analyzed light and provide corresponding detection signals, and processing means to process the detection signals to derive said polarization-related characteristic, wherein said light leaving the optical path is analyzed to provide transmitted coherent optical power at each wavelength of light in each of at least two groups of wavelengths, and wherein the lowermost ($\lambda_L$) and uppermost ($\lambda_U$) said wavelengths in each said group of wavelengths are separated by a first small optical frequency difference;

and wherein each of the said at least two groups comprises a wavelength pair, said pair in each group defining a midpoint wavelength therebetween, and being mutually spaced by a second small optical-frequency difference, the second small optical-frequency difference being equal to or less than the first optical-frequency difference, said second small optical-frequency difference ($\delta v$) being the same for corresponding wavelength pairs in different groups, and wherein the I-SOP and A-SOP are substantially constant for each coherent optical power at each said wavelength in each said group, and wherein at least one of the midpoint wavelength, I-SOP and A-SOP is different between the respective said groups, the processing step including the steps of:

(i) computing at least one difference between a pair of measured power parameters each corresponding to a respective one of the wavelengths in said wavelength pair for each of the said at least two groups, each said measured power parameter being proportional to transmitted coherent optical power of the said analyzed and subsequently detected light, thereby defining for said at least two groups a set of at least two measured power parameter differences;

(ii) computing a mean-square value of said set of at least two measured power parameter differences; and (iii) calculating the polarization-related optical path characteristic as a predetermined function of said mean-square value, said predetermined function being dependent upon the said second small optical-frequency difference between the wavelengths corresponding to the said each of at least said two pairs of wavelengths.

According to another aspect, there is provided measurement instrumentation for measuring a polarization-related characteristic of an optical path wherein light comprising polarized light is propagated, the measurement instrumentation comprising:

polarization-controller-and-analyzer means for connection to the optical path at or adjacent either the proximal end thereof or a distal end thereof and operable to control at least one of a state of polarization (I-SOP) of light launched in the optical path and a state of polarization (A-SOP) used to analyze light leaving the optical path, polarization-controller-and-analyzer means for connection to the optical path at or adjacent either the proximal end thereof or a distal end thereof and operable to control at least one of a state of polarization (I-SOP) of light launched in the optical path for one wavelength pair or for many one wavelength pairs for a wide wavelength range e.g. 1 to 100 nm and a state of polarization (A-SOP) used to analyze such lights leaving the optical path, detecting means for detecting the analyzed light corresponding to at least one analyzer SOP (A-SOP) and providing corresponding detection signals, and detecting means for detecting the analyzed light corresponding to at least one analyzer SOP (A-SOP) for one wavelength pair or for many one wavelength pairs for a wide wavelength range e.g. 1 to 100 nm and providing corresponding detection signals, processing means for processing the detection signals to derive said polarization-related characteristic, wherein said light leaving the optical path is analyzed to provide transmitted coherent optical power at each wavelength of light in each of at least two groups of wavelengths, and wherein the lowermost ($\lambda_L$) and uppermost ($\lambda_U$) said wavelengths in each said group of wavelengths are separated by a first small optical frequency difference;

and wherein each of the said at least two groups comprises a wavelength pair, said pair in each group defining a midpoint wavelength therebetween, and being mutually spaced by a second small optical-frequency difference, the second small optical-frequency difference being equal to or less than the first small optical-frequency difference, and defining a midpoint wavelength therebetween, said second small optical-frequency difference ($\delta v$) being the same for corresponding wavelength pairs in different groups, and wherein the I-SOP and A-SOP are substantially constant for each said wavelength in each said group, and wherein at least one of the midpoint wavelength, I-SOP and A-SOP is different between the respective said groups, the measurement instrumentation being operable to:

i) compute at least one difference between a pair of measured power parameters each corresponding to either or an average of the measured optical power parameters at wavelengths corresponding to respective ones of a wavelength pair centered about said midpoint wavelength, said wavelength pair comprised within each of the said at least two groups, each said measured power parameter being proportional to transmitted coherent optical power of the said analyzed and subsequently detected light, thereby defining for said at least two groups a set of at least two measured power parameter differences, the said average of the measured power parameters at wavelengths are referred to average over some or preferably to average over all repeated reflected light pulses so as to obtain an averaged reflected power;

ii) compute a mean-square value of said set of at least two measured power parameter differences; and iii) calculate the polarization-related optical path characteristic as a predetermined function of said mean-square value, said predetermined function being dependent upon the said second small optical-frequency difference between the wavelengths corresponding to the said each of at least said two pairs of wavelengths.

In some embodiments, the herein-describes techniques can be applicable to the measurement of differential group delay (DGD) of an optical fiber FUT at a particular wavelength, or root-mean-square or mean DGD over a specified wavelength range. When the specified wavelength range is sufficiently wide, the root-mean-square or mean DGD measurement closely approximates the polarization mode dispersion (PMD) behavior of the optical fiber FUT.

In yet another embodiment, there is provided a method for measuring a polarization mode dispersion (PMD) to characterize an optical fiber under test, the method comprising:

from a proximal end of the optical fiber under test which distal end is connected to a light reflector, performing a plurality of polarization-sensitive acquisitions using a polarization-sensitive Optical Time Domain Reflectometer (POTDR), wherein each acquisition is performed by propagating in the optical fiber device under test, a polarized test signal comprising at least a first light pulse and at least a second light pulse, each comprising at least one pulse, and detecting a corresponding polarization-analyzed return light signal coming back from the optical fiber under test and comprising back-reflected light from the light reflector, said return light signal comprising first reflected light pulse and a second reflected light pulse, wherein each of said acquisitions is performed with a corresponding wavelength of said test signal, wherein said plurality of polarization-sensitive acquisitions defines at least one pair of acquisitions performed with mutually different but closely-spaced wavelengths and substantially the same state of polarization (SOP), a center of said wavelengths defining a center wavelength for said at least one pair, and wherein said plurality of polarization-sensitive acquisitions comprises a plurality of pairs of acquisitions performed with at least one of a plurality of mutually-different center wavelengths and a plurality of mutually-different states of polarization (SOP); and for each said acquisitions, reading an amplitude of said first and said second reflected light pulses to obtain values of reflected power;

for each said acquisitions, normalizing each said value of reflected power by dividing said value of reflected power by an average value of reflected power over said first and said second reflected light pulses;

for each said pairs of said acquisitions, computing a value of a difference, between the two normalized values of reflected powers corresponding to said pair;

computing a mean-square value of the computed values of difference over said at least one of a plurality of mutually-different center wavelengths and a plurality of mutually-different states of polarizations (SOPs); and from said mean-square value, calculating a value of the polarization mode dispersion of said optical fiber under test.

In some embodiments, said at least a first light pulse comprises a first series of a repeated light pulses and said at least a second light pulse comprises a second series of repeated light pulses, wherein the second series is propagated before detection of the return light signal of the first series; wherein said return light signal comprises a first series of repeated reflected light pulses and a second series of reflected light pulses; and wherein a value of reflected power for said first series is obtained by averaging respective amplitudes of at least part of said repeated reflected light pulses of said first series and a value of reflected power for said second series is obtained by averaging respective amplitudes of at least part of said repeated reflected light pulses of said second series.

In this specification, the terms "Optical frequency" ($\upsilon$) and "wavelength" ($\lambda$) are used interchangeably, the two being related by $\lambda = c/\upsilon$, where c represents the speed of light in vacuum. Note that a wavelength, as used herein, corresponds to that which would be measured in a vacuum.

The term "optical Fiber-Under-Test (FUT)" designate an optical fiber link for which one wishes to measure at least one polarization-related characteristic. The FUT comprises primarily optical fiber, but it may also include intervening optical elements such as optical amplifiers, optical switches and routers, etc. Note that FUT does not necessarily correspond to a link connecting network nodes, but may be a portion of such a link for which access may be gained via "tap" or monitor ports for "in-service" measurements, or by temporarily breaking into the fiber path for "dark fiber" measurements. Of course, the FUT may also not be part of an actual network and may be tested in a lab or manufacturing environment for example.

The term "lightpath" refers to a particular restricted spectral region of an optical link within which a particular data-carrying signal normally propagates (often termed optical "channel"), whether or not said spectral width is delimited by intervening optical filtering.

The term "State of Polarization" (SOP) defines the polarization properties of a light beam (i.e. the relative amplitude and phases of the electric field) within a particular short time interval and at a particular location.

The term "Differential Group Delay" (DGD) is a parameter quantifying, for a given optical frequency $\upsilon$ and within a particular short time interval, the maximum difference in optical propagation time along a guided propagation medium (primarily a single-mode optical fiber), for all possible SOPs launched into the propagation medium.

The term "analyzer" refers to a component that permits detection of only that fraction of the incident light corresponding to an SOP aligned with its low-loss ("maximum-transmission") axis. This component may be highly polarization-dependent (e.g. a linear polarizer, or polarization beam splitter PBS), having mutually-orthogonal low-loss and high-loss axes. Alternatively, it may comprise other means, such as optical combining means to combine polarized highly-coherent local oscillator light (e.g. from a tunable laser) with the light under test to interfere at subsequent heterodyne-detection means, the degree of detected heterodyne signal depending upon the relative alignment of the local oscillator SOP with the SOP of the light under test.

The term "analyzer SOP" ("A-SOP") refers to the SOP of light corresponding to maximum subsequent detection as it enters a combination of a polarization-controller and an analyzer. Although A-SOP varies as the polarization controller is varied, in some variants it may be fixed (e.g., to act as a quarter-wave plate), as is the case for a polarimeter having three analyzers, the (fixed) A-SOPs of the analyzers being normally mutually orthogonal.

The term "input SOP" ("I-SOP") refers to the state of polarization of light as it is launched into the FUT.

The term "Polarization Mode Dispersion" (PMD) refers to the polarization-related physical phenomenon giving rise to polarization-dependent temporal spreading of an optical pulse. Although in theory it is defined as an average of the DGD($\upsilon$) values over all possible optical frequencies, in practice it is normally estimated from an average of the DGD($\upsilon$) over a significantly wide prescribed spectral range encompassing wavelengths of interest (e.g., the telecom C or C+L bands of minimal-loss transmission). In telecom optical fiber, moderate to high PMD may cause DGD($\upsilon$) to vary significantly over the prescribed spectral range. The PMD is usually defined as the root-mean-square (rms) average of the DGD($\upsilon$) over the prescribed spectral range ("rms PMD", or simply "PMD"), but, alternatively, may be defined as the arithmetic mean of the DGD($\upsilon$) over this same spectral range ("mean PMD").

The term "partial DGD" ($DGD_P$) refers to a parameter quantifying the degree to which the DGD of the guided propagation medium (e.g. optical fiber), for a given optical frequency $\upsilon$ and within a particular short time interval, will induce temporal pulse spreading of a test signal launched therein with a particular input SOP. This parameter is thus a polarization-dependent characteristic of the optical light-path, manifest by its effect upon the test signal. For a given optical frequency and at a particular time, the $DGD_P$ will have a value less than or equal to the corresponding DGD value—hence the terminology "partial DGD".

The term "Degree of polarization" (DOP) of a light beam is defined as the relative difference between the maximum and minimum power of a light beam that traverses an adjustable polarization controller and analyzer combination disposed in the physical light path. In other words, if, upon suitable adjustment of the polarization controller, the light power in the beam may be extinguished by 90% from its maximum transmission value by the analyzer, the DOP=90%.

The term "Optical Time Domain Reflectometer (OTDR)" refers to a test instrument that launches optical pulses into an optical fiber and detects the resulting backreflected light to provide distance-resolved information characterizing a FUT.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application. In particular, the term "about" generally refers to a range of numbers that one skilled in the art would consider equivalent to the stated value (e.g., having the same or an equivalent function or result). In some instances, the term "about" may mean a variation of +10% of the stated value. It is noted that all numeric values used herein are assumed to be modified by the term "about", and that all conditions, relationships or characteristics used herein are assumed to be modified by the term "substantially", unless stated otherwise. The term "between" is used herein to refer to a range of numbers or values defined by endpoints is intended to include both endpoints, unless stated otherwise.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

Further features and advantages of the present invention will become apparent to those of ordinary skill in the art upon reading of the following description, taken in conjunction with the appended drawings.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combined with other features from one or more other exemplary embodiments.

BRIEF DESCRIPTION OF THE DRAWINGS

FIG. 2 (Prior Art) is a schematic illustrating that two polarization-sensitive acquisitions are performed at respective two different wavelengths but with the same SOP, wherein each acquisition generally involves propagating a large number (N) of substantially identical light pulses in the optical fiber link and averaging the results, in order to improve the Signal-to-Noise Ratio (SNR).

FIG. 3 is a schematic illustrating an improved PMD measurement method in which each polarization-sensitive acquisitions involves launching repeated light pulses, i.e., series of light pulses, for the SSA single-ended overall PMD measurement, in which each OTDR acquisition involves propagating a large number (N) of repeated light pulses in the optical fiber link, wherein the light pulses are sent as a pulse train, i.e., repeated light pulses are together propagated in the FUT within a fiber round-trip time.

FIG. 5 is a schematic illustrating an improved PMD measurement method in accordance with another embodiment in which each polarization-sensitive acquisitions involves launching two simple light pulses for the SSA single-ended overall PMD measurement, in which each OTDR acquisition involves propagating two light pulses in the optical fiber link, wherein the two light pulses are together propagated in the FUT within a fiber round-trip time, and wherein acquisition of two pulses produce two repeated data.

FIG. 6 is a schematic illustrating an improved PMD measurement method in accordance with yet another embodiment in which each polarization-sensitive acquisitions involves launching repeated light pulses, i.e., a series of light pulses, for the SSA single-ended overall PMD measurement, in which each OTDR acquisition involves propagating a large number (N) of repeated light pulses in the optical fiber link, wherein the light pulses are sent as a pulse train, i.e., repeated light pulses are together propagated in the FUT within a fiber round-trip time, and wherein two repeated data $i_1$ and $i_2$ are obtained from the acquisition of two series of light pulses propagated within distinct fiber round-trip time of the FUT.

FIG. 8 comprises FIG. 8A and FIG. 8B which are graphs showing measurement results from the single-ended overall PMD measurement method of FIGS. 1, 3, 4, 5 and 6. FIG. 8A shows a measured overall PMD value of 5.52 ps from Root-Mean-Square (RMS) calculation of the measured transmission differences for many wavelength pairs between 1480 nm and about 1625 nm, whereas FIG. 8B shows the measured transmissions (after the normalization for the detected back-refection signal powers) for many wavelengths between 1480 nm and about 1625 nm.

Figure 1A:
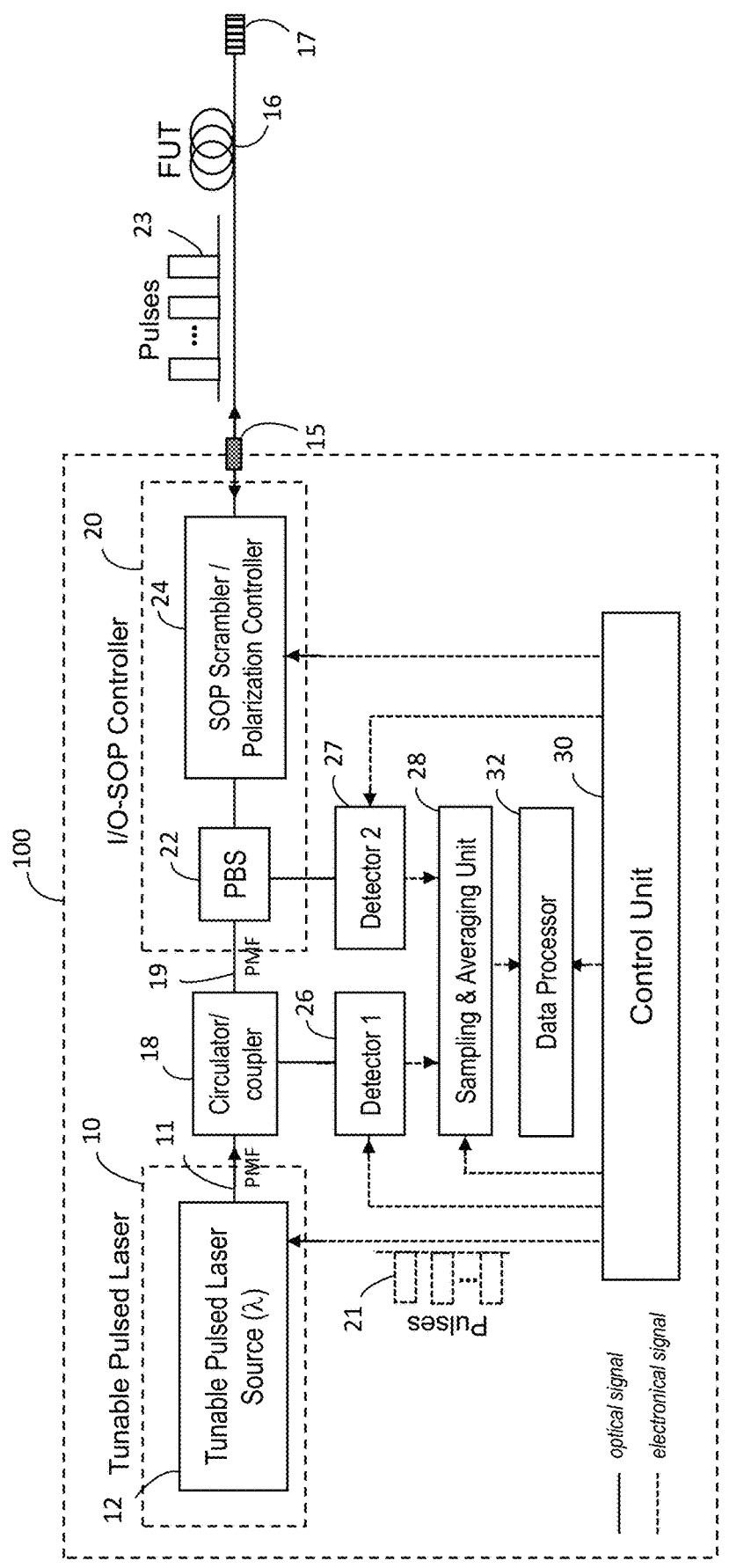
FIG. 1A is a simplified block diagram of measurement instrumentation for single-ended measurement of the PMD by connection to a proximal end of the optical Fiber Under Test (FUT), for performing single-ended measurements on the optical path to determine the PMD, in accordance with one embodiment in which a Polarization Beam Splitter (PBS) 22 is used.

It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

DESCRIPTION

There is herein described a "single-ended" method of PMD measurement. When referring to single-ended PMD measurement, it is meant herein that all of the active components of the measurement instrumentation are at a single end (referred to as the "proximal end") of the optical Fiber Under Test (FUT). In single-ended embodiments where the "overall PMD" of the FUT is being measured, a light reflector may be connected at the distal end of the FUT, such as an UPC connector or a fiber mirror in order to improve the dynamic range of the measurement.

Figure 1B:
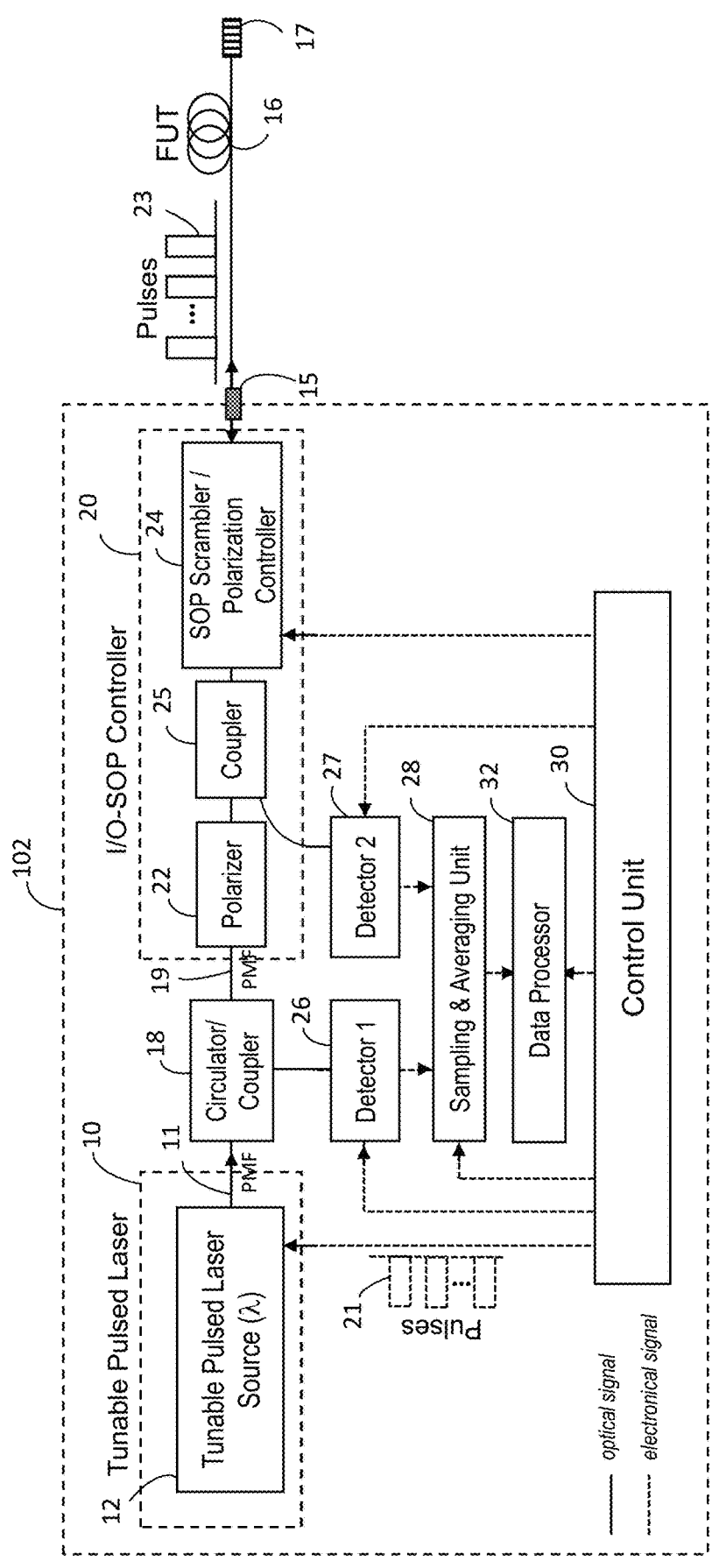
FIG. 1B is a simplified block diagram of measurement instrumentation for single-ended measurement of the PMD by connection to a proximal end of the FUT, for performing single-ended measurements on the optical path to determine the PMD, in accordance with one embodiment in which a polarizer 22, a coupler 25 (either 50:50 or any coupling ratio) and two detectors 26, 27 are used.
Figure 1C:
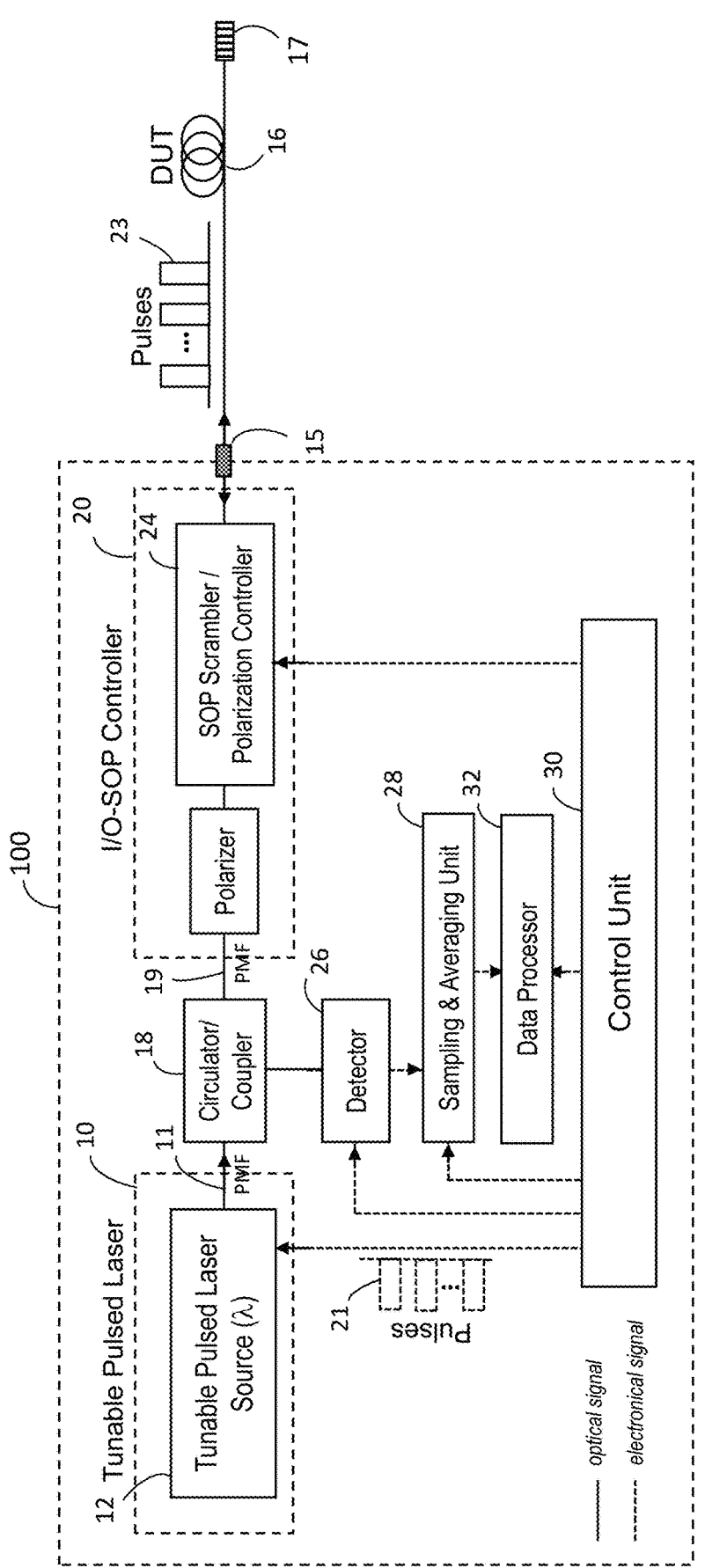
FIG. 1C is a simplified v diagram of measurement instrumentation for single-ended measurement of the PMD by connection to a proximal end of the FUT, for performing single-ended measurements on the optical path to determine the PMD, in accordance with one embodiment in which a polarizer 22 is used with a single detector 26.

Single-ended PMD measurement-instrumentation systems 100 are now described with reference to FIGS. 1A, 1B and 1C. A PMD measurement instrumentation system connects to the FUT 16 via an optical interface 15 and mainly comprises a light source unit 10 comprising a tunable pulsed light source 12, a polarization-controller-and-analyzer unit 20 comprising a polarization discriminator 22 and a SOP scrambler/polarization controller 24, a light detection assembly 26, 27, 28, a data processor 32 and a control unit 30. In single-ended measurement configurations, the polarization-controller-and-analyzer unit 20, the light detection assembly 26, 27, 28, the data processor 32 and the control unit 30 are located with the light source unit 12 at the proximal end of the FUT 16. Single-ended measurement-instrumentation systems 100 are configured to generate a test signal comprising repeated light pulses which are together propagated in the FUT 16 within a fiber round-trip time for the SSA PMD test and analysis method. FIGS. 1A, 1B and 1C are simplified schematic diagrams of measurement instrumentation systems for the single-ended measurement of PMD for performing single-ended measurements on the optical path to determine DGD at one or more wavelengths and/or mean DGD and/or rms DGD or PMD.

The single-ended PMD measurement-instrumentation systems 100 of FIGS. 1A, 1B and 1C comprise a tunable OTDR-based single-ended PMD measurement instrumentation, which comprises the tunable pulsed light source 12, the SOP scrambler/polarization controller 24 and a backreflection extractor 18 which can be implemented, e.g., as an optical circulator or optical coupler. The tunable pulsed light source 12 is configured to produce a test signal 23 comprising repeated light pulses in the form of a train of pulses. For example, in one implementation, a test signal 23 may comprise, e.g., a train of 10 to 100 pulses with a pulse period of 0.1 to 10 us that is being propagated in the FUT 16 after passing through the polarization-controller-and-analyzer unit 20. The backreflection extractor 18 comprises either an optical circulator or an optical coupler to couple the test signal from the light source unit 10 toward the FUT 16 (via the optical interface 15) and then extract the return light signal which comes back from the FUT (via the optical interface 15) and which comprises back-reflected light from the light reflector 17 connected at the distal end of the FUT, toward the light detection assembly 26, 27, 28. The back-reflection extractor 18 is bidirectional in that it conveys the test signal from the SOP scrambler/polarization controller 24 to the FUT 16 and conveys the return light signal from the FUT 16 to the SOP scrambler/polarization controller 24. It is noted that in the implementations of FIGS. 1A, 1B and 1C, the tunable pulsed light source 12 is connected to the 24 by PMF 19.

Optionally, a fiber patchcord with a non-angled polished connector (e.g., FC/PC or FC/UPC) or a fiber pigtailed mirror is connected to the distal end of FUT 16 to provide a localized light reflector 17. In fact, any type of reflector that can reflect the light from the end of FUT 16 back into the measuring instrumentation may be used.

The control unit 30 is used to control the light source unit 10, the polarization-controller-and-analyzer unit 20 and the light detection assembly 26, 27, 28. It notably comprises a pulse generator used to generate the test signal comprising repeated light pulses. The light detection assembly 26, 27, 28 receives the light signal which returns from the FUT and represents back-reflected light from the light reflector 17, after polarization analysis using the SOP scrambler/polarization controller 24, to perform polarization-sensitive OTDR acquisitions. The light detection assembly 26, 27, 28 comprises conventional optical hardware and electronics as known in the art for performing OTDR acquisitions on an optical fiber link, including at least one detector 26, 27 (such as Avalanche Photodiode(s) (APD)) and a sampling and averaging unit 28. The data processor 32 receives the sampled signal and is configured to produce a value of reflected power from the acquisitions and analyze the acquisitions to compute the PMD therefrom. The data processor 32 may be implemented in one or more processing units.

It is noted that a same one or more processing units may be used to implement both the functions of the data processor 32 and the control unit 30. In other embodiments, distinct processing units or computers may be used for implementing the two functions.

In the measurement instrumentations illustrated in FIGS. 1A, 1B and 1C, the light source unit 12 and the polarization-controller-and-analyzer unit 20 share the same polarization discriminator 22. The polarization discriminator 22 is implemented as a PBS 22 in the embodiment of FIG. 1A and polarizer 22 in that of FIGS. 1B and 1C. Like the polarization discriminator 22 and the backreflection extractor 18, the SOP scrambler/polarization controller 24 is used bidirectionally in the sense that it conveys input light towards the FUT 16 via the fiber connector 15 and backreflected light returning from the FUT 16 (referred to herein as the "return light signal") in the opposite direction. The SOP scrambler/polarization controller 24 (also referred to herein as the I/A-SOP controller 24) combines the functions of an input SOP (I-SOP) controller and an analyzer SOP (A-SOP) controller. In the illustrated embodiments, the backreflection extractor 18 is connected to the light source unit 12, by a segment of polarization-maintaining fiber (PMF) 11 and also to the input of the polarization discriminator 22 (polarizer or PBS) by another segment of PMF 19. The backreflection extractor 18 conveys the return light signal to the light detection assembly 26, 27, 28. In the embodiments of FIGS. 1A, 1B, the light detection assembly comprises two detectors 26 and 27, whereas in the embodiment of FIG. 1C, a single detector 26 is used. The light detection assembly detects the return light signal which comprises a train of light pulses resulting from the propagation of a test signal in the FUT, which in turn comprises repeated light pulses as generated by the tunable pulsed light source 12. The output of the polarization discriminator 22 is connected to the input of the SOP scrambler/polarization controller 24 by non-PMF fiber (such as, e.g., SMF-28 fiber).

It should be noted that the tunable pulsed light source 12 can produce repeated light pulses 23 to probe the FUT 16 via the fiber connector 15 while the return light signal as reflected from the light reflector 17 is measured by light detection assembly. In order to do so, the total length (in time) of the train of repeated light pulses should be smaller or significantly smaller than a round-trip time of test signal in the FUT. In the embodiments of FIGS. 1A, 1B and 1C, the pulse period and the time delay between any two consecutive pulses are the same for all pulses but, in other embodiments, the pulse period and/or time delay may vary from pulse to pulses.

It should be noted that the return light signal may be detected by either two detectors 26 and 27 or one detector 26.

It should be noted that simultaneously detecting the backreflected light with two detectors 26 and 27 may not be always necessary. It may also be detected at slightly different time.

It should also be noted that detecting the return light signal with one detector either 26 or 27 may be always possible.

In use, in the measurement instrumentation shown in FIG. 1A, a test signal comprising repeated light pulses is generated by the light source unit 10 and is launched into FUT 16 via fiber connector 15. The return light signal resulting from backreflected light returning from the FUT (i.e., mainly caused by the Fresnel reflection on the on the light reflector 17 at the distal end of the FUT 16) returns back to polarization-controller-and-analyzer unit 24 via fiber connector 15, entering the I/A-SOP controller 24 in the reverse direction. Its I/A-SOP is transformed by the I/A-SOP controller 24, following which the light is decomposed by the polarization discriminator 22. In the case of FIG. 1A, the PBS 22 decomposes the return light signal into two components having orthogonal SOPs, typically linear SOPs at 0- and 90-degree relative orientations. Detector 27 is connected to one of the two outputs of the PBS 22 to receive one of these orthogonal components and the backreflection extractor 18 is connected to the other output. Detector 26 is in turn connected to the output port of the backreflection extractor 18 that transmits light from the PBS 22, so as to receive the other orthogonal component. Once suitably calibrated to take into account the relative detector efficiencies, wavelength dependence, circulator loss, etc., as will be described hereinafter, the sum of the detected powers from detectors 26 and 27 is proportional to the total power ($S_0$) of the return light signal. The return light signal may be detected approximately simultaneously by detectors 26 and 27.

The control unit 30 not only controls the tunable pulsed light source 12, but also controls the sampling and averaging unit/circuitry 28, in known manner, specifically to use an internal analog-to-digital converter to sample the corresponding electrical signals from the detectors 26 and 27 as a function of time to obtain the corresponding electrical response signals. The electrical response signals may then be sampled and averaged to provide an OTDR trace for a particular test signal comprising repeated light pulses (i.e., a series of light pulses), and the value of reflected power for a given series of repeated light pulses is obtained by averaging the mean response pulse over a substantial portion of its duration and then averaging at least part (and likely all) of the multiple pulses from a detected series of repeated reflected light pulses to provide a value of reflected power for each series of repeated reflected light pulses. This procedure is repeated resulting in a plurality of values of reflected power. The said duration represents a time window for averaging (or time gating) and may depend upon the pre-filtering of the sampling-and-averaging electronics. The resulting averaged value of reflected power is used by data processor 32 to derive the DGD or PMD value, i.e., the differential group delay (DGD) or polarization mode dispersion (PMD) of the FUT 16 from its distal end or any other connectors. It will be appreciated that the usual conversions will be applied to convert time delay to distance according to refractive index to obtain the length of fiber.

The process of propagating in the FUT, a test signal comprising repeated light pulses and detecting a corresponding polarization-analyzed return light signal coming back from the optical fiber device under test and representing back-reflected light from the light reflector (the return light signal comprising repeated reflected light pulses) is referred to herein as an "acquisition", which acquisition is said to be polarization-sensitive.

In addition to controlling the sampling-and-averaging circuit 28, the control unit 30 controls the wavelength of the tunable pulsed light source 12 and the I/A-SOP selected by I/A-SOP controller 24. More specifically, for each setting k of the I/A-SOP controller 24, the control unit 30 causes acquisitions to be performed for at least one pair of wavelengths $$\lambda_L^{(k)} \text{ and } \lambda_U^{(k)},$$

respectively, that are closely-spaced relative to one another. The midpoint wavelength of the pair is defined as the average of the actual wavelengths of the series of light pulses, i.e., $$\lambda_k = \left(\lambda_L^{(k)} + \lambda_U^{(k)}\right)/2$$

(the labels L and U refer, for convenience and ease of understanding, to "lower" and "upper" with respect to the midpoint wavelength $\lambda_k$).

A plurality of such acquisitions is performed to obtain a group of acquisitions comprising one or more pairs of series of light pulses.

It should be appreciated that, where a group comprises one or more than one pair of series of light pulses, the midpoint wavelength as defined above in fact differs for each pair in the group (see FIG. 3).

It should be appreciated that, where the group comprises many pairs of series of light pulses, the midpoint wavelength for each pair in the group can be tuned continuously by either step mode or continuously wavelength swept tuning mode (see FIG. 4), for one fixed SOP with a wavelength range of, e.g., 1 nm to 100 nm. Optionally, such procedure may be repeated for a plurality of different wavelength regions. For example, the procedure may be repeated for 20 different SOPs with a wavelength range of 10 nm for each SOP, for a total wavelength range of 200 nm from 1450 nm to 1650 nm.

It should also be appreciated that the center wavelength is only a conceptual definition, defined only for the purpose of facilitating description when a group comprises more than two wavelengths. In the limit where a group comprises only two wavelengths, it is of course equivalent to the "midpoint wavelength" defined hereinbefore. Center wavelength is not needed anywhere in the computations, and there is no need for accurately "centering" the group on some target center wavelength since the latter is defined as the midpoint wavelength, and there is no need to set the laser wavelength at the center wavelength. Only the knowledge of the step(s) is needed, i.e., the difference between any pair that is used in the computations of PMD, irrespective of the center wavelength.

The I/A-SOP controller 24 sets the different I-SOPs and A-SOPs in a pseudo-random manner, such that the points conventionally representing SOPs on the Poincaré sphere are substantially uniformly distributed over the surface of said sphere, whether the distribution is random or a uniform grid of points.

Implementations of the "single-ended overall-PMD" measurement embodiments encompass various modifications to the measurement instruments shown in FIGS. 1A, 1B and 1C.

If the optical path between the output of tunable pulsed light source 12 and the input of the polarization discriminator 22 (e.g. PBS in FIG. 1A) is polarization-maintaining, the backreflection extractor 18 would conveniently comprise either a polarization-maintaining circulator or a polarization-maintaining coupler. It is noted that using a circulator offers the advantage of providing about 3 dB more dynamic range than a 50/50 coupler (although in many cases such reduced power may not be critical for the measurement).

The light pulse length (or, equivalently duration) of the series of light pulses 23 from the tunable pulsed light source 12 may be chosen to be long, such as, e.g., from 0.1 us to over 10 μs, but a short pulse length may also be applied.

Referring to FIG. 1B, instead of the PBS 22 of FIG. 1A, the polarization discriminator 22 may comprise the combination of a polarizer 22 and coupler 25, at the expense of approximately 3-dB dynamic range for the case of a 50/50 coupler. The second detector 27 (FIG. 1B) is then connected to one of the arms of the coupler 25 so as to detect a fraction of the (non-analyzed) backreflected light for processing to deduce the total backreflected power of the pulses.

It is noted that if the optical path between the output of the tunable pulsed light source 12 and the input of the polarization discriminator 22, e.g., the polarizer 22 in FIG. 1B and polarization beam splitter (PBS) 22 in FIG. 1A, is not polarization maintaining, the backreflection extractor 18 need not be polarization-maintaining. It is noted that for proper measurement, care should be taken to calibrate the relative sensitivities of the two detectors 1 and 2 (26 and 27), including the losses induced by the intervening circulator 18 or coupler 25, etc., for use with the single-ended overall PMD measurement instrument of FIGS. 1A and 1B. It should be appreciated that, in the embodiment of FIGS. 1A and 1B, calibration of the mean relative gain is not required; the measured total power is independent of the SOP, and there is no need for an "absolute" calibration to directly measure absolute transmission values; they can be obtained to within an unknown constant factor. The subsequent normalization over the mean traces averaged over SOPs, as described hereinbefore, eliminates the unknown factor.

It is envisaged that, where the detection means comprises a single detector (as in FIG. 1C), normalized powers can be obtained by averaging the reflected powers obtained for a first series and a second series of repeated light pulses (see description below) and dividing each value of reflected power by the averaged reflected power to obtain a first and a second normalized values of reflected powers respectively corresponding to a first series and a second series of repeated light pulses.

In any of the above-described embodiments, the operation of the I/A-SOP controller 24 is such that, for a given SOP of the light (which can be any SOP on the Poincaré Sphere) received at its input, the SOP of the light leaving its output will be any one of a number of substantially uniformly distributed SOPs on the Poincaré Sphere, whether the distribution is of random or deterministic nature. Typically, the number of output states of polarization is about 5-100, but it could be any practical number. It is noted that the distribution of the SOPs need not, and generally will not, be truly random; so "pseudo-random" might be a more appropriate term in the case where a random distribution is indeed used for convenience because it is easier and less expensive to implement than a uniform grid of SOPs.

The light detection assembly, whether comprising a single detector 26 or a pair of detectors 26 and 27, and the sampling-and-averaging unit 28 which can perform sampling and averaging of return light signals comprising light pulses, may be the same or similar to those employed in standard commercial OTDRs that are known to a person skilled in this art.

One aspect that differs from standard commercial OTDRs is the way the sampling and averaging is performed in the case of a test signal comprising a series of light pulses. First, the sampling-and-averaging unit 28 receives the return light signal (comprising back-reflected light from the light reflector 17) and rearranges the timing of each pulse of the series of light pulses in the return light signal to add pulses together to average respective amplitudes of the repeated reflected light pulses to obtain a value of reflected power, thereby averaging the noise. In the case of a first series and a second series of repeated light pulses, two values of reflected power are obtained at the same or substantially the same wavelength, but with different noise characteristics.

Figure 4:
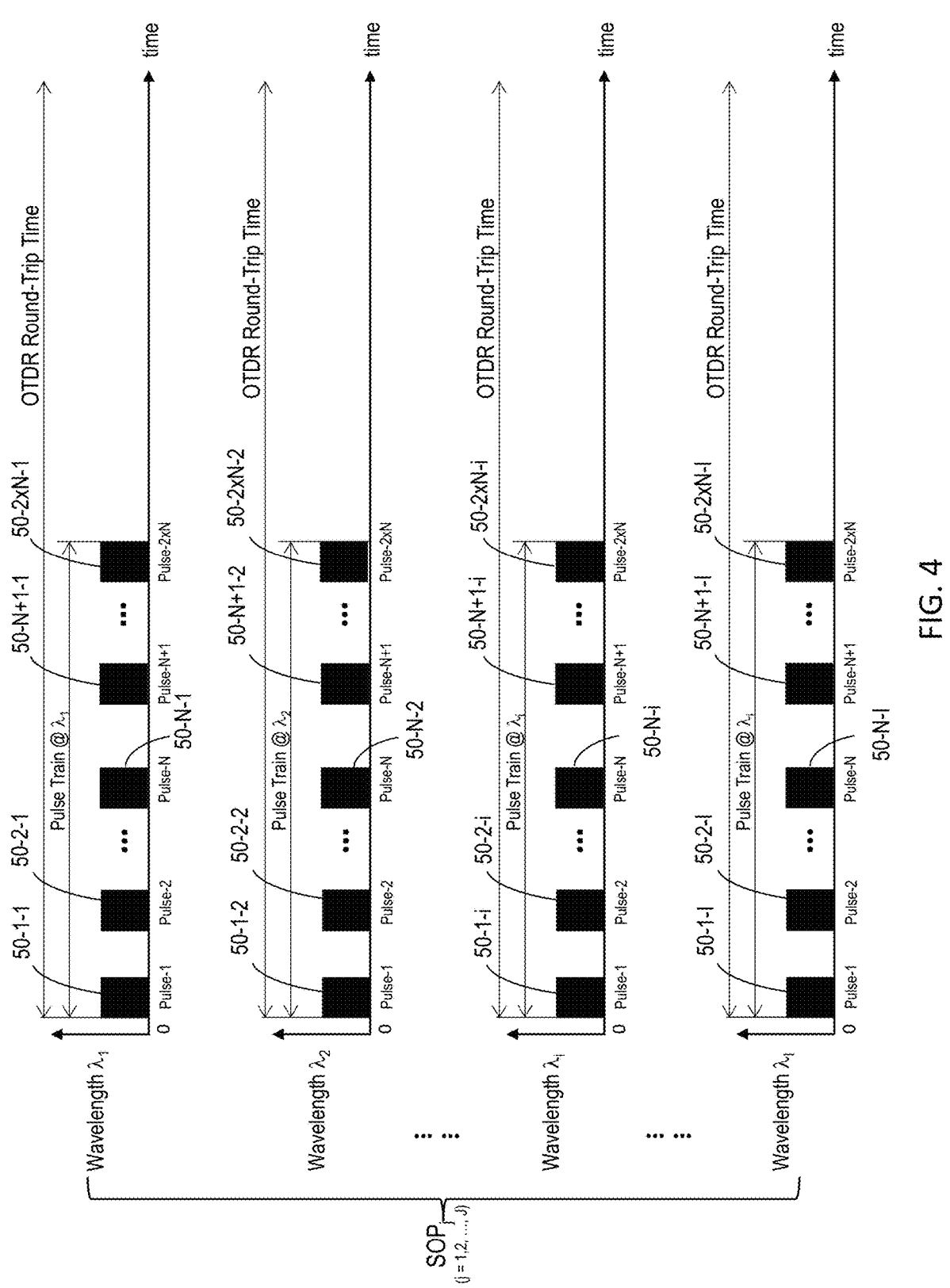
FIG. 4 is a schematic illustrating an improved acquisition method in which acquisitions as described herein with reference to FIG. 3 are repeated for a plurality of wavelengths $\lambda_1$ to $\lambda_L$ thereby defining multiple pairs of acquisitions performed with mutually different but closely-spaced wavelengths $(\lambda_i, \lambda_{i+1})$ to cover a wavelength range.

Now referring to FIGS. 2, 3 and 4, the acquisition process is described in more details.

FIG. 2 illustrates the prior art method of U.S. Pat. No. 7,920,253 to Cyr et al. It shows that two polarization-sensitive acquisitions are performed at respective two different wavelengths but with the same SOP. Each acquisition generally involves propagating a large number (N) of substantially identical light pulses in the optical fiber link and averaging the results, in order to improve the Signal-to-Noise Ratio (SNR). In this case, the result obtained from averaging is herein referred to as a back-reflected light power. In the illustrated case, for normalization purposes (see below) two series of acquisitions are performed, i.e., corresponding to pulses 1 to N and pulses N+1 to 2×N for one wavelength $\lambda_i$ (see FIG. 2 (up)). Then such acquisition is repeated for next wavelength $\lambda_{i+1}$ (see FIG. 2 (down)), and such acquisitions may be repeated for a plurality of wavelength pairs where each pair of two acquisitions have a given fixed same SOPs but different SOPs for any different wavelength pairs. In this more conventional OTDR measurement, light pulses are launched in the FUT one at a time, e.g., with a typical waiting time of a FUT round-trip time (during which the return light signal is acquired), before sending the next pulse. U.S. Pat. No. 7,920,253 describes a single-ended PMD or DGD measurement method using such a polarization-sensitive optical time domain reflectometer (POTDR). A disadvantage of this prior art single-ended measurement is that it usually leads to a very long PMD measurement acquisition time of several minutes e.g., 3 to 10 minutes dependent on the test instrument acquisition parameter setting, the fiber length, etc.

FIG. 3 illustrates an improved PMD measurement method in which each polarization-sensitive acquisition involves launching repeated light pulses, i.e., series of light pulses, for the SSA single-ended overall PMD measurement. As shown in FIG. 3, in this case, each acquisition involves propagating a large number (N) of repeated light pulses in the optical fiber link, wherein the light pulses are sent as a pulse train, i.e., repeated light pulses are together propagated in the FUT 16 within a fiber round-trip time. The large number (N) of repeated light pulses is also used to average the results in order to improve the Signal-to-Noise Ratio (SNR). Only in this case, the averaging process is more complex and involves rearranging the timing of each pulse of the series of light pulses in the return light signal to add the pulses together and thereby average the noise. As shown in FIG. 3, here, two series of light pulses ($i_1$ and $i_2$) are launched one after the other at a first wavelengths $\lambda_i$ and two series of light pulses $i+1_1$ and $i+1_2$ are launched one after the other at a second wavelengths $\lambda_{i+1}$ but with the same SOPj, wherein the first and the second wavelengths are mutually different but closely-spaced wavelengths. Therefore, each pulse train comprises a first series of light pulses (50-1 to 50-N/52-1 to 52-N) and a second series of light pulses (50N+1 to 50-2×N/52-N+1 to 52-2×N). Averaging over N return light pulses yield one acquisition, such that 2 acquisitions are performed for each wavelength. Here, a small time delay, e.g., Ins to 1000 ns may be left between any two consecutive pulses, e.g., without any or small waiting time related a FUT round-trip time, before the detection of the back-reflected return light signal. For example, for obtaining one pair of acquisitions, the acquisition time corresponds to two time the round-trip time, e.g., acquisition time 2 ms for N=10 and FUT=100 km. In comparison, in the prior art, (see U.S. Pat. No. 7,920,253 to Cyr et al.) for the acquisition of one pair of acquisitions, the acquisition time would be 4N times the round-trip time, e.g., acquisition time 40 ms for N=10 and FUT=100 km. It means that the acquisition time may be improved by a factor of 10 to 20 times compared to the prior art method (see U.S. Pat. No. 7,920,253 to Cyr et al.). The number N of pulses in each series of light pulses may be chosen so as to obtain a signal to noise ratio (SNR)

that is greater than a target SNR, such as SNR>6 to 20 dB. For example, the number N of pulses may be between 4 and 100.

FIG. 3 illustrates sending repeated multiplex light pulses simultaneously to send at least two series or more than two series ($i_1$ and $i_2$) of repeated pulses (e.g., 2×N repeated pulses) at first and then second given wavelengths into the FUT, where a total length of the at least two series at first or second given wavelengths is less than a round-trip time within the FUT, and a separation time between each pulse is even. It is noted that in other embodiments, a time separation between the pulses may not be even. Acquisitions are repeated for at least one pair of mutually different wavelengths but with substantially the same SOP. It should be noted that any two consecutive pulses are separated by a small time delay, e.g., Ins to 1000 ns, and, e.g., without any or small waiting time related to a FUT round-trip time, before the detection of the back-reflected light returning from the FUT end.

FIG. 4 illustrates an improved acquisition method in which acquisitions as described herein with reference to FIG. 3 are repeated for a plurality of wavelengths $\lambda_1$ to $\lambda_T$, thereby defining multiple pairs of acquisitions performed with mutually different but closely-spaced wavelengths ($\lambda_i$, $\lambda_{i+1}$) to cover a wavelength range, e.g., between 1450 nm and 1650 nm or any other wavelength ranges between 1250 nm and 1650 nm. In one embodiment, in order to perform such acquisitions, the laser wavelength may be set in continuous tuning of the laser wavelength, i.e., continuously tuning laser wavelength from low wavelength to high, e.g., from wavelength 1450 nm to 1650 nm or from high wavelength to low, e.g., from wavelength 1650 nm to 1450 nm. The tuning speed, e.g., 2 to 20 nm/s, may be set so that all pulses of one series of light pulses has substantially the same or negligible laser frequency difference compared to frequency difference between two distinct acquisitions of a pair. In another embodiment, the laser wavelength may be set in step mode to cover a wavelength range, e.g., between 1450 nm and 1650 nm or any other wavelength ranges between 1250 nm and 1650 nm. The laser wavelength may be tuned step by step from low wavelength to high, e.g., from wavelength 1450 nm to 1650 nm, or from high to low, e.g., from wavelength 1650 nm to 1450 nm, wherein all pulses of one series of light pulses has substantially the same or negligible laser frequency difference compared to the frequency difference between two distinct acquisitions of a pair.

Referring to FIG. 4, in some embodiments, acquisitions may be repeated for a plurality of different wavelengths (>2) but with the same SOPj.

As in FIG. 3, two series of light pulses may be launched one after the other at a first wavelengths $\lambda_i$ and two series of light pulses be launched one after the other at a second wavelengths $\lambda_{i+1}$ but with the same SOPj, wherein the first and the second wavelengths are mutually different but closely-spaced wavelengths. Therefore, each pulse train comprises a first series of light pulses (50-1–$i$ to 50-N–i) and a second series of light pulses (50-N+1–i to 50-2×N–i). Averaging over N return light pulses yield one acquisition, such that 2 acquisitions are performed for each wavelength. Here, a small time delay, e.g., 10 ns to 1000 ns is left between any two consecutive pulses, e.g., without any or small waiting time related a FUT round-trip time, before the detection of the back-reflected return light signal.

Then, such two acquisitions for a plurality of different wavelengths but with the same SOPj may also be repeated for a plurality of different SOPs (j=1, 2, . . . , J, wherein J may be from 2 to 200) within the same wavelength range, e.g., 10 nm between 1540 nm and 1550 nm or for a plurality of different wavelength regions with different SOPs, e.g., for 15 different SOPs and a wavelength range of 10 nm between 1470 nm and 1620 nm.

In FIG. 4, acquisitions are performed for two series, such as the first series of pulses 1 to N and the second series of pulses N+1 to 2×N, for at least two different wavelengths (e.g. from 1 to I, where I=2-1000) but with the same SOP and amplitude of pulses are averaged over a plurality (≤N) of detected repeated reflected light pulses (so to produce one averaged value of reflected power for each series). It is noted that, although there is no advantage to do so, the averaging need not include all pulses of a series. It should be noted that any two consecutive pulses may have a small delay time e.g. Ins to 1000 ns. Such two averaged values of reflected power at a plurality of mutually different wavelengths with the same SOP may also be repeated for a plurality of different SOPs at the same or similar wavelength range, e.g., 10 nm or about 10 nm between about 1540 nm and about 1550 nm, or a plurality of wavelength regions e.g., for 15 SOPs for 15 different wavelength ranges between 1470 nm and 1620 nm, where each wavelength range is about 10 nm. It is noted that the wavelength range and SOP number can be defined or designed as any practical numbers according to the instrument design.

FIG. 5 is a schematic illustrating an improved PMD measurement method in accordance with another embodiment in which each polarization-sensitive acquisitions involves launching two simple light pulses 51-1 and 51-2 for the SSA single-ended overall PMD measurement, in which each OTDR acquisition involves propagating two light pulses 51-1 and 51-2 in the optical fiber link, wherein two light pulses 51-1 and 51-2 are together propagated in the FUT within a fiber round-trip time, and wherein acquisition of two pulses 51-1 and 51-2 produce two data $i_1$ and $i_2$. For each acquisition, an amplitude of the first and the second reflected light pulses is read to obtain values of reflected power for the first and the second light pulse 51-1 and 51-2. Then, for each acquisition, each value of reflected power may be normalized by dividing the value of reflected power by an average value of reflected power over the first and the second reflected light pulses. A value of the PMD of the FUT is calculated from the mean-square value of the differences between normalized values of reflected power corresponding to a pair, over a plurality of mutually-different center wavelengths or a plurality of mutually-different states of polarizations (SOPs).

FIG. 6 is a schematic illustrating an improved PMD measurement method in accordance with yet another embodiment in which each polarization-sensitive acquisitions involves launching repeated light pulses, i.e., a series of light pulses 55-1, 55-2, . . . , 55-N, for the SSA single-ended overall PMD measurement, in which each OTDR acquisition involves propagating a large number (N) of repeated light pulses 55-1, 55-2, . . . , 55-N in the optical fiber link, wherein the light pulses are sent as a pulse train, i.e., repeated light pulses 55-1, 55-2, . . . , 55-N are together propagated in the FUT within a fiber round-trip time, and wherein two repeated data $i_1$ and $i_2$ are obtained from the acquisition of two series of light pulses 55-1, 55-2, . . . 55-N and 57-1, 57-2, . . . , 57-N propagated within distinct fiber round-trip time of the FUT. In comparison of FIG. 3, the method of FIG. 6 may be used to improve a SNR of 1.5 dB if both methods send the same number of repeated light pulses within one round-trip of the FUT.

Figure 7:
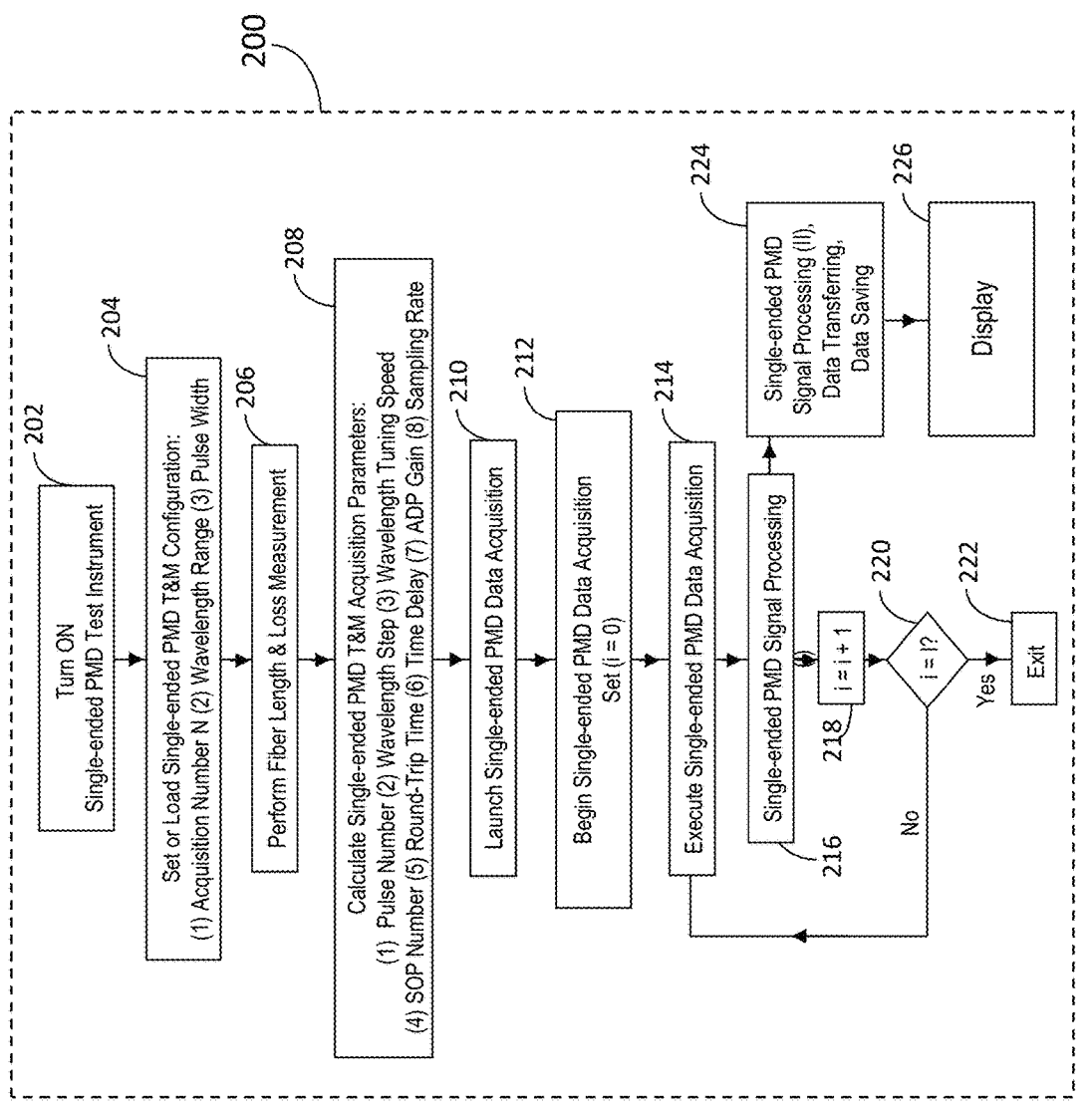
FIG. 7 is a flowchart illustrating operation of the single-ended overall PMD measurement of FIGS. 1A, 1B, 1C, 3 and 4.

FIG. 7 is a flowchart illustrating the operation of the single-ended PMD measurement instrumentation systems of FIGS. 1A, 1B, 1C, 3, 4, 5 and 6. In step 202, the single-ended PMD measurement instrumentation system is turned on. In step 204, a set of measurement configuration parameters for single-ended PMD test and measurement is loaded in the instrumentation system, either with default or automatic settings or manually set by a user. The measurement configuration parameters may include the acquisition number N of pulses in each series of light pulses, the wavelength range to be covered and the pulse width, etc. In step 206, a configuration acquisition is performed toward the FUT in order to determine the optical fiber length and total loss of the FUT. Then, in step 208, acquisition parameters are determined by the system as a function of the optical fiber length and total loss of the FUT. The acquisition parameters may comprise the number N of pulses in each series of light pulses, the wavelength step between two series of light pulses, the wavelength tuning speed, the number J of SOPs, the roundtrip time within the FUT, the time delay between any two consecutive pulses, the detector gain and/or the sampling rate. In step 210, polarization-sensitive acquisitions are launched using acquisition parameters determined in step 208. Acquisitions may be performed as described, e.g., with reference to FIGS. 3 and/or 4. In steps 212, 214, 216, 218, 220 and 222, the polarization-sensitive acquisitions are repeated for a plurality of wavelengths $\lambda_i$ to obtain I polarization-sensitive acquisitions. In step 224, the polarization-sensitive acquisitions are processed to calculate a value of the PMD of the FUT. In step 226, measurement results may be displayed or otherwise output.

Figures 8A, 8B:
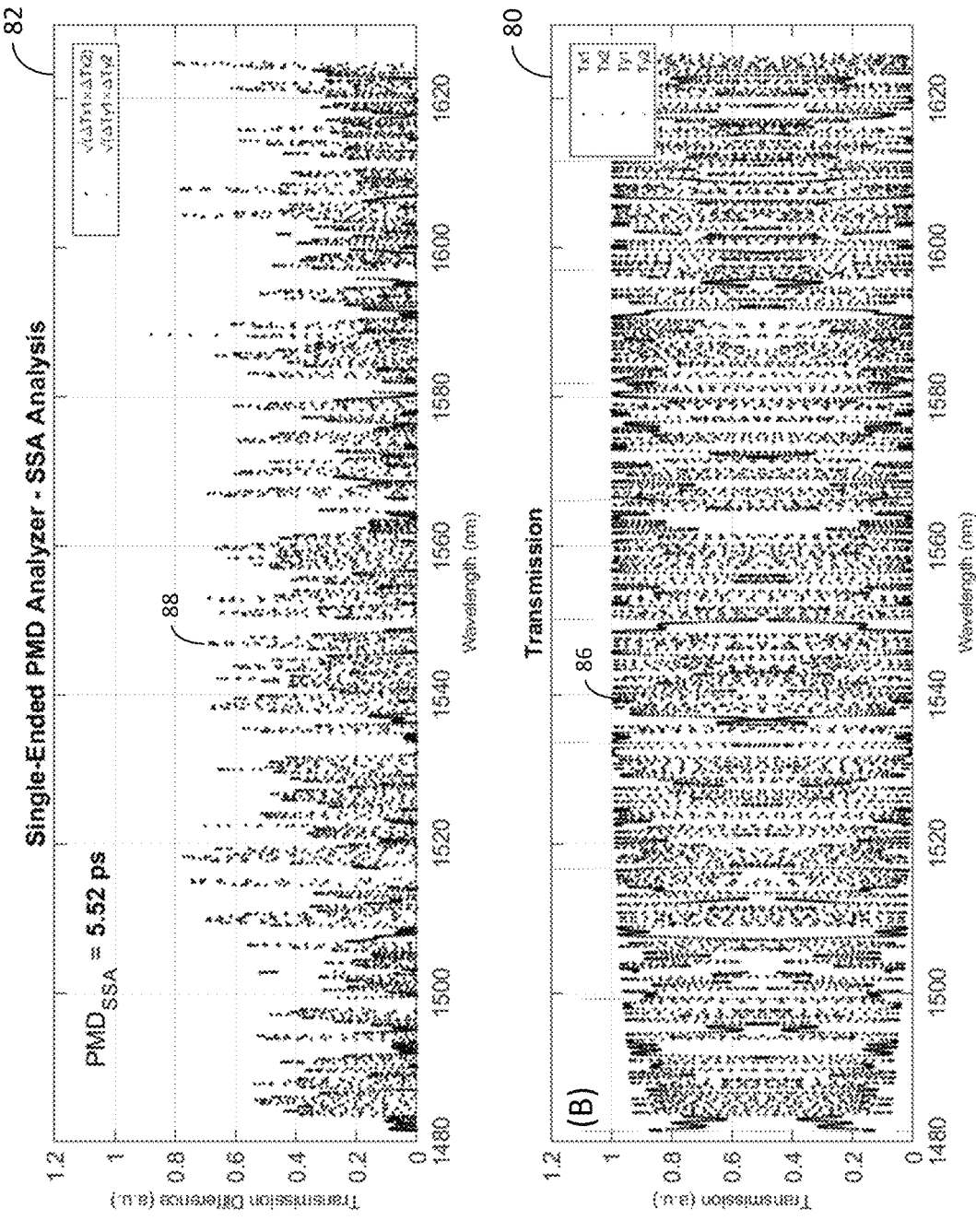

FIG. 8 shows measurement results obtained from the single-ended PMD measurement method described herein with reference to FIGS. 1, 3, 4, 5 and 6 and the SSA PMD analysis method described herein below. The PMD was previously measured with a reference PMD test method and a value of 5.44 ps was obtained. As shown in FIG. 8A, the measured PMD is 5.52 ps, which was obtained from a Root-Mean-Square (RMS) calculation of the measured transmission differences 88 for a plurality of wavelength pairs between 1480 nm and 1625 nm. The FUT length is 100 km. FIG. 8B shows the measured transmissions 86 (after the normalization for the detected back-refection signal powers) for a plurality of wavelengths between 1480 nm and about 1625 nm.

SSA PMD Measurement Theory

Fast single-ended overall PMD measurement by using repeated light pulses is a very important measurement technique for the field applications. There are now described the principles of the Scrambled State of Polarization PMD Analysis (SSA) method which can be applied to the single-ended overall PMD measurement. Single-ended measurement of PMD-related characteristics described herein comprises one embodiment for measuring the overall PMD of a FUT by analyzing backreflected light from the distal end of FUT such as from a fiber PC or UPC connector or from a fiber mirror.

It should be noted that the below described Scrambled State of Polarization PMD Analysis (SSA) method theory for the single-ended overall PMD measurement is described in more detail in U.S. Pat. Nos. 7,920,253 and 9,829,429 both to Cyr et al. The reader is referred to these documents for more detail.

Single-ended PMD measurement using backreflected light from the distal end of the FUT may be used when there are no optical amplifiers along the fibers. Below we describe the SSA theory as applied to single-ended overall PMD determination via measurement instrumentation adjacent only one end of FUT.

It is noted that if a light reflector (such as an UPC connector or a fiber mirror) is connected at the distal end of the FUT, and if one can neglect Rayleigh backscattering and any spurious discrete reflections (e.g. from any connectors or splices) along the FUT, the tunable pulsed light source 12 could be replaced by a tunable CW laser (no pulses) and a power meter for measuring the power reflected from the light reflector at the distal end of the FUT at two closely spaced optical frequencies, $v_U$ and $v_L$, around a given midpoint frequency, $v_{mid}$, for a large number K of (I-SOP, A-SOP) couples, i.e., one such setting referring to both the input-SOP and the analyzer-SOP of the backreflected light. The SSA theory provides a relationship for the roundtrip-DGD(v) expressed in terms of the mean-square differences of normalized powers (i.e. transmission) observed at closely-spaced optical-frequencies $v_U$ and $v_L$, each pair corresponding to one of a multiplicity of (I-SOP, A-SOP) couples. This relationship is valid in all cases for any type of practical FUT regardless of its degree of randomness or its polarization coupling ratio, including the extreme case of a PMF fiber, as, $$DGD_{RoundTrip}(v) = \frac{1}{\pi \delta v} \arcsin\left(\alpha_{ds} \sqrt{\langle \Delta T^2(v)\rangle_{SOP}}\right) \quad (1)$$

$<\,>_{SOP}$ represents the average over the K (I-SOP, A-SOP) couples, $\delta v = (v_U - v_L)$ is the "step", $\Delta T$ is the difference between the normalized values of reflected power observed at $v_u$ and $v_L$, respectively. The relationship holds for $DGD_{RoundTrip}\cdot\delta v < \frac{1}{2}$, thus clarifying the meaning of "closely-spaced optical frequencies".

If changes in the I-SOP polarization controller and A-SOP polarization controller are correlated (as would be the case in implementations for which a common "I/A-SOP" polarization controller is employed), then $$\alpha_{ds} = \sqrt{\frac{15}{4}} \quad (2a)$$

If, however, the I-SOP and A-SOP polarization controllers are not correlated, then $$\alpha_{ds} = \sqrt{\frac{9}{2}} \quad (2b)$$

The relationship in equation (1) holds for $DGD\cdot\delta v < 0.3$ for single-ended measurement configurations, thereby defining the meaning of "closely-spaced optical frequencies".

The reference mean-value for single-ended measurement configurations is:

$$u_0 = \frac{2}{3} \quad (3)$$

The roundtrip DGD(υ) derived by equation (1) is not simply twice the forward DGD(υ). The roundtrip $DGD_{RMS}$ (i.e. PMD) extracted from a rms average of DGD(υ) values over a wavelength range is also not simply twice double the forward $DGD_{RMS}$. For the latter case, however, when averaged over wavelength, or time, the PMD value (i.e. rms DGD) is related to the roundtrip-PMD (i.e. rms $DGD_{RoundTrip}$) through a simple factor, the roundtrip factor $\alpha_{rt} = \sqrt{3/8}$, i.e., $DGD_{RMS} = \alpha_{rt}\cdot DGD_{RoundTripRMS}$ or $PMD = \alpha_{rt}\cdot PMD_{RoundTrip}$, where PMD is defined as the root-mean-square (RMS) value of DGD.

For the alternative definition of PMD, i.e., the mean value of DGD, then $\alpha_{rt} = 2/\pi$.

Typically, in order to reliably measure the overall PMD, a tunable pulsed light source is used. The tunable pulsed light source launches a series of light pulses into the FUT. The at least one detector 26, 27 then detects the return light signal which comes back from the FUT and comprising back-reflected light from the localized light reflector at the distal end of FUT.

The roundtrip DGD of the FUT section comprised between the output of the instrument and the selected reflection is obtained from equation (1), where the power observed for a given (I-SOP, A-SOP) couple is now obtained as, for example, the value of reflected power obtained by averaging N pulses of the return light signal obtained for a series of light pulses backreflected from the selected reflection.

It should be noted that the power reflected from the light reflector may be obtained by averaging N pulses of the return light signal which corresponds to the far end. It may be advantageous to apply a long series of light pulses (e.g. over 1 to 20 μs) having as the greatest possible number N of pulses, such as, e.g., 2 to 200.

Furthermore, in some embodiments for which overall total PMD is measured, the average indicated in equation (1) may be carried out over both I-SOP, A-SOP and midpoint-wavelengths, all three of which are changed from one group comprising two closely-spaced wavelengths to the next, thus obtaining the roundtrip PMD instead of only one particular DGD at one particular wavelength. A roundtrip rms DGD (i.e. roundtrip PMD) over the prescribed wavelength range is expressed as:

$$PMD_{RoundTrip} = \frac{1}{\pi \delta v} \arcsin\left(\alpha_{ds} \sqrt{\langle \Delta T^2(v)\rangle_{SOP;v}}\right) \quad (4)$$

Moreover, the forward PMD value (simply denoted as "PMD", and unless otherwise stated, assumed to be defined based on the RMS definition) is related to the round-trip PMD by the same "round trip factor", i.e. $\alpha_{rt} = \sqrt{3/8}$, yielding:

$$PMD = \alpha_{rt} \cdot PMD_{RoundTrip} \quad (5)$$

In the limit of a sufficiently small optical-frequency difference ("step") between the closely-spaced wavelengths, equations (1) and (4) tend to the following simpler differential formulae:

$$DGD_{RoundTrip}(v) = \frac{\alpha_{ds}}{\pi \delta v} \cdot \sqrt{\langle \Delta T^2(v)\rangle_{SOP}} \quad (1a)$$

$$PMD_{RoundTrip}(v) = \frac{\alpha_{ds}}{\pi \delta v} \cdot \sqrt{\langle \Delta T^2(v)\rangle_{SOP;v}} \quad (4a)$$

A measurement of the PMD based on equation (1) or (1a) offers the advantage of a relatively short acquisition time, since there is no need to perform intermediate determination of the $DGD_{RoundTrip}(v)$ according to equations (1) or (1a). Nevertheless, rms $DGD_{RoundTrip}$ or mean $DGD_{RoundTrip}$ may be obtained from individually measured $DGD_{RoundTrip}(v)$ for many different midpoint optical frequencies u by root-mean-square or mean $DGD_{RoundTrip}(v)$ from equation (1) or (1a) over a prescribed optical frequency range, e.g.

$$\text{rms } DGD_{RoundTrip} =$$
$$\sqrt{\left\langle DGD_{RoundTrip}^{2}(v)\right\rangle_{v}} \text{ and mean } DGD_{RoundTrip} = \left\langle DGD_{RoundTrip}(v)\right\rangle_{v}.$$

Forward rms DGD and mean DGD are then obtained by simply multiplying a roundtrip factor of $\sqrt{3/8}$ and $2/\pi$ on rms $DGD_{RoundTrip}$ and mean $DGD_{RoundTrip}$, respectively.

It should be noted that an overall total pulse length of a series of light pulses including their total delay time used for the single-ended overall PMD measurement should be less than the length of the FUT, preferably significantly less (to avoid excessive Rayleigh scattering noise, for instance), e.g. 100×1 µs corresponds to a fiber length of approximately 10,000 meters.

It should be noted that the tunable pulsed light source produces a series of light pulses at one given wavelength being launched into the FUT for the single-ended overall PMD measurement should be less than the length of the FUT. Then, the tunable pulsed light source produces a series of light pulses at a next given wavelength in a significantly small waiting time, e.g., slightly longer than a FUT round-trip time, such as, e.g., 1.01 ms for a fiber length of approximately 100,000 meters. The tunable pulsed light source may also produce a series of light pulses from one given wavelength to next wavelength, over a plurality of wavelengths, e.g., from 10 to 50000 wavelengths within available tunable pulses light source tunable wavelength range with a small step of 2-50 pm for maximum measurable PMD value.

Also, the PMD measurement from the single-ended overall PMD measurement may use a plurality of different of midpoint wavelengths, e.g., 10 to 50000, in order to improve the fundamental PMD measurement accuracy.

The detected return light signals are processed to obtain the DGD or PMD values, as will now be described. It should be noted that the labels x and y refer to the return light signals obtained at photodetectors 26 and 27, respectively.

The normalized transmissions, labelled hereinafter as T, are computed differently according to the implementation.

For the implementation of FIG. 1A (two photodetectors 26 and 27 with a PBS 22), the normalized power is computed as below:

$$T_{L}^{(k)} = \frac{Px_{L}^{(k)}}{Px_{L}^{(k)} + Py_{L}^{(k)}} \quad T_{L}''^{(k)} = \frac{Px_{L}''^{(k)}}{Px_{L}''^{(k)} + Py_{L}''^{(k)}} \quad (6)$$
$$T_{U}^{(k)} = \frac{Px_{U}^{(k)}}{Px_{U}^{(k)} + Py_{U}^{(k)}} \quad T_{U}''^{(k)} = \frac{Px_{U}''^{(k)}}{Px_{U}''^{(k)} + Py_{U}''^{(k)}}$$

wherein Px and Px" are values of reflected power from detector 1 for a first and a second series of light pulses, respectively, and Py and Py" are values of reflected power from detector 2 for a first and a second series of light pulses, respectively, and T and T" are values of transmissions that are obtained from equations (6). It should be appreciated that the different Py powers have been pre-multiplied by a factory calibration factor or a measured relative gain using a plurality of measured powers for a large number of A-SOPs, before they are used in equation (6). Note that the different Py powers are presumed to have been already pre-multiplied by the measured relative gain from single-ended measurement, as by the auto-calibration procedure, before they are used in this normalization procedure.

For the embodiment with single photodetector with linear polarizer 22 of FIG. 1C, the only available return light signals are from Px 26 (obtained here from one photodetector 26). Here, the detected power is assumed to be roughly constant during the time period for measurement of the initial and repeated pulse powers for the above normalization. The normalized power is then obtained as in Eq. (7) but without computing the ratio of power x over power y first, i.e.

$$T_{L}^{(k)} = u_{o}\frac{Px_{L}^{(k)}}{\langle P_{L}\rangle_{SOP}} \quad T_{L}''^{(k)} = u_{o}\frac{Px_{L}''^{(k)}}{\langle P_{L}\rangle_{SOP}} \quad (7)$$
$$T_{U}^{(k)} = u_{o}\frac{Px_{U}^{(k)}}{\langle P_{U}\rangle_{SOP}} \quad T_{U}''^{(k)} = u_{o}\frac{Px_{U}''^{(k)}}{\langle P_{U}\rangle_{SOP}}$$

where $$u_{0} = 1/2,$$

and the average power is defined as.

$$\langle P_{L}\rangle_{SOP} = \frac{1}{2K}\sum_{k}\left(Pk_{L}^{(k)} + Px_{L}''^{(k)}\right) \quad \langle P_{U}\rangle_{SOP} = \frac{1}{2K}\sum_{k}\left(Px_{U}^{(k)} + Px_{U}''^{(k)}\right) \quad (8)$$

For the implementation of single photodetector, a reference mean value of $u_{o}=\frac{2}{3}$ for single-ended measurement may also be used in this normalization procedure.

Here we assume that power levels being launched into FUT at $$\lambda_{U}^{(k)} \text{ and } \lambda_{L}^{(k)}$$

are nearly the same.

It should be noted that, in the equations above, $< >_{SOP;v}$ can refer to averaging over either the I-SOPs, the A-SOPs, or the midpoint optical frequency (wavelength), ideally over all three, i.e., changing both the (I-SOP, A-SOP) couple and wavelength from one group of powers to the next. All of these relationships are fundamentally valid in all cases even if only polarization scrambling is applied, giving the correct value of the DGD at one particular midpoint wavelength. Then, scanning the midpoint wavelength only serves the purpose of averaging DGD over wavelength as per the definition of the statistical PMD value. On the contrary, as discussed earlier, averaging only over wavelength while keeping the (I-SOP, A-SOP) couple unchanged requires that assumptions about the FUT be met, and also requires a large value of the product PMD·Δv. The same remarks apply for the equations presented hereinafter.

The calculation of the product of the repeated differences between normalized traces at $\lambda_{U}$ and $\lambda_{L}$ is averaged as follows:

$$\langle \Delta T^2(v) \rangle_{SOP;v} = \tag{9}$$

$$\langle (T_U - T_L) \cdot (T_U'' - T_L'') \rangle_{SOP;v} = \frac{1}{K} \sum_k (T_U^{(k)} - T_L^{(k)}) \cdot (T_U''^{(k)} - T_L''^{(k)})$$

Reference is made to the repeated series of light pulses ($i_1$ and $i_2$) of FIG. 3. In conventional mathematical terms, equation (9) may be referred to as the second-order joint moment of the repeated differences. Doing so, the noise averages to zero instead of being "rectified", because the noise superimposed on a given power $i_1$ is not correlated with the noise superimposed on the corresponding repeated power $i_2$. That is the first motivation for sampling repeated traces.

It is noted that in other embodiments which do not involve repeated series ($i_1$ and $i_2$), i.e., a single series of light pulses is launched for each wavelength, then the calculation of the product of the repeated differences between normalized traces at $\lambda_U$ and $\lambda_L$ is averaged as follows:

$$\langle \Delta T^2(v) \rangle_{SOP;v} = \langle (T_U - T_L)^2 \rangle_{SOP;v} = \frac{1}{K} \sum_k (T_U^{(k)} - T_L^{(k)})^2 \tag{9a}$$

Then, in any case, the PMD is directly computed according to the arcsine formula as, $$PMD = \alpha_{rt} \frac{1}{\pi \delta v} \arcsin \left( \alpha_{ds} \sqrt{\langle \Delta T^2(v) \rangle_{SOP;v}} \right) \tag{10}$$

where a roundtrip factor $$\alpha_{rt} = \sqrt{\frac{3}{8}}.$$

A theoretical constant $$\alpha_{ds} = \sqrt{\frac{15}{4}}$$

is valid for the cases where a common (same) state of polarization controller/scrambler is used to control both input SOP (I-SOP) and analyzer SOP (A-SOP), such as in FIG. 1A.

It should be appreciated that the arcsine formula, in Eq. (10), is not the only possible one. The purpose of using this formula is to obtain a result that is unbiased even if using a relatively large step, such that PMD·$\delta v$~0.15, without introducing a significant error; this in order to maximize the signal-to-noise ratio and therefore the dynamic range of the instrument. If one is not concerned with maximizing the dynamic range, or keeping the overall measurement time reasonable, one might select a much smaller step, and use the simpler differential formula that follows, $$PMD = \alpha_{rt} \cdot \frac{\alpha_{ds}}{\pi \delta v} \cdot \sqrt{\langle \Delta T^2(v) \rangle_{SOP;v}} \tag{10a}$$

This is not to infer that this formula is better or particularly advantageous, but merely that it may conveniently be used if the step is much smaller, i.e., satisfying the condition PMD·$\delta v$<0.01.

It should be noted that a forward PMD calculated from equations (10) and (10a) is a PMD or rms DGD of FUT.

It should also be noted that roundtrip rms DGD or roundtrip mean DGD can also be obtained from a root-mean-square for $DGD_{RoundTrip}(v)$ or mean for $DGD_{RoundTrip}(v)$ at many different wavelengths for a given wavelength range and $DGD_{RoundTrip}(v)$ at each given wavelength can be computed the arcsine formula as either, $$DGD_{RoundTrip}(v) = \frac{1}{\pi \delta v} \arcsin \left( \alpha_{ds} \sqrt{\langle \Delta T^2(v) \rangle_{SOP}} \right). \tag{11}$$

or use the simpler differential formula that follows, $$DGD_{RoundTrip}(v) = \frac{\alpha_{ds}}{\pi \delta v} \cdot \sqrt{\langle \Delta T^2(v) \rangle_{SOP}}. \tag{11a}$$

where normalized power (T) is obtained from each give wavelength.

A rms DGD and mean DGD (forward) can also be obtained by simply multiplying a roundtrip factor of $\sqrt{3/8}$ and $2/\pi$ on rms $DGD_{RoundTrip}$ and mean $DGD_{RoundTrip}$, respectively, where a rms $DGD_{RoundTrip}$ or mean $DGD_{RoundTrip}$ can be obtained from measured $DGD_{RoundTrip}$ (v) for many different midpoint wavelengths by root-mean-square or mean $DGD_{RoundTrip}(v)$ from equations (11) or (11a) over wavelength range, e.g. a prescribed $$\text{rms } DGD_{RoundTrip} =$$

$$\sqrt{\langle DGD_{RoundTrip}^2(v) \rangle_v} \text{ and mean } DGD_{RoundTrip} = \langle DGD_{RoundTrip}(v) \rangle_v.$$

It should also be noted that the above computation equations for extracting DGD and PMD using normalized power (usually a normalized power is ranged between 0 to 1) may be replaced by other methods. For example, only a relative power may be computed from the measured powers, then a "normalization factor" may be employed in the equations (10) and (11) to cancel this factor that is multiplied on mean-square difference, so as to obtain correct a DGD or PMD value.

It should be noted that the above equations for calculating the DGD or PMD include a factor representing a theoretical constant $$\alpha_{ds} = \sqrt{\frac{15}{4}}.$$

This theoretical constant value is valid for the cases where the same common state of polarization controller/scrambler is used for controlling both input SOP (I-SOP) and analyzer SOP (A-SOP), such as in FIG. 1A. However, when two separate independent input- and analyzer-SOP controllers/scramblers are used in conjunction with a polarizer or PBS located just before the detector, not shown here, a different theoretical constant, i.e.

$$\alpha_{ds} = \sqrt{\frac{9}{2}},$$

should be used. (Note that this theoretical constant is the same as that employed with the two-ended PMD measurement equations).

For the case where the tunable pulsed light source has a relatively big linewidth and a high PMD fiber is under test, a linewidth "correction factor" may need to be applied in equations (10, 11a) in order to extract an accurate PMD value from the FUT.

It should also be noted that repeated powers may be obtained from measurements at different times using the same detectors, or from measurements using different detectors, e.g. where the light power is split by a coupler, by detecting a series back-reflected pulse train pulses within one round-trip time of the FUT for a plurality of laser wavelengths that may be tuned under either step mode or continuously swept mode, and the return light signal is detected by the different detectors contemporaneously.

Example of OTDR Device Architecture

Figure 9:
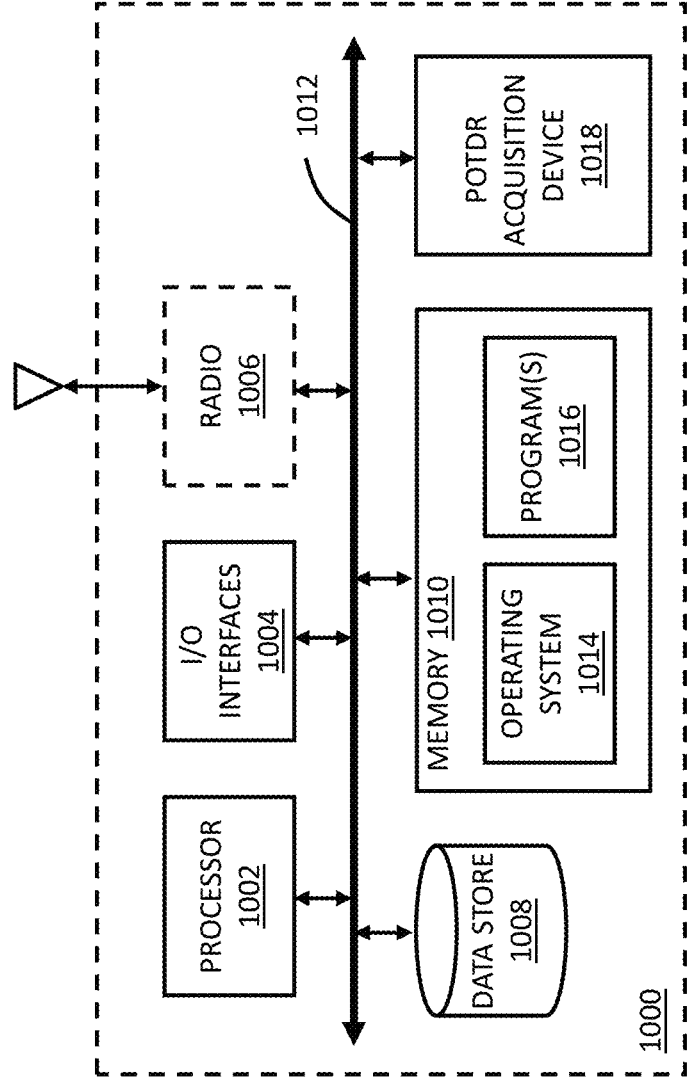
FIG. 9 is a block diagram illustrating an example architecture of a measurement instrumentation for single-ended measurement of the PMD.

FIG. 9 is a block diagram of a measurement instrumentation system 1000 which may embody the single-ended PMD measurement instrumentation system 100 of FIG. 1A, 1B or 1C. The measurement instrumentation system 1000 may comprise a digital device that, in terms of hardware architecture, generally includes a processor 1002, input/output (I/O) interfaces 1004, an optional radio 1006, a data store 1008, a memory 1010, as well as an optical test device including a POTDR acquisition device 1018. It should be appreciated by those of ordinary skill in the art that FIG. 9 depicts the measurement instrumentation system 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the measurement instrumentation system 1000 is in operation, the processor 1002 is configured to execute software stored within the memory 1010, to communicate data to and from the memory 1010, and to generally control operations of the measurement instrumentation system 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the measurement instrumentation system 1000 and/or output at least one of the values derived by the data processor.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as POTDR acquisition data and measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), non-volatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 9, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the measurement instrumentation system 1000. For example, example programs 1016 may include a web browser to connect with a server for transferring measurement data files, a dedicated application configured to control POTDR acquisitions by the POTDR acquisition device 1018, set POTDR acquisition parameters, analyze acquisition data obtained by the POTDR acquisition device 1018 and display a GUI related to the measurement instrumentation system 1000. For example, the dedicated POTDR application may embody a POTDR data processor configured to analyze acquired data in order to characterize the optical fiber link under test, and produce measurement data files.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the measurement instrumentation system 1000 via the radio 106. In such cases, at least some of the programs 1016 may be located in a memory of such a mobile device, for execution by a processor of the physically distinct device. The mobile device may then also include a radio and be used to transfer measurement data files toward a remote test application residing, e.g., on a server.

It should be noted that the measurement instrumentation system shown in FIG. 9 is meant as an illustrative example only. Numerous types of computer systems are available and can be used to implement the measurement instrumentation system.

The embodiments described above are intended to be exemplary only and one skilled in the art will recognize that numerous modifications can be made to these embodiments without departing from the scope of the invention.

Although illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated herein is thus only provided for efficiency of teaching the described embodiment.

Although the present disclosure has been illustrated and described herein with reference to specific embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

The invention claimed is:

1. A method for measuring a polarization mode dispersion (PMD) to characterize an optical fiber under test, the method comprising:

from a proximal end of the optical fiber under test which distal end is connected to a light reflector, performing a plurality of polarization-sensitive acquisitions using a polarization-sensitive Optical Time Domain Reflectometer (POTDR), wherein each acquisition is performed by propagating in the optical fiber under test, a polarized test signal comprising a first series of repeated light pulses and detecting a corresponding polarization-analyzed return light signal coming back from the optical fiber under test and comprising back-reflected light from the light reflector, said return light signal comprising repeated reflected light pulses, wherein said repeated light pulses are together propagated in the optical fiber under test within a fiber round-trip time;

wherein each of said acquisitions is performed with a corresponding wavelength of said test signal, wherein said plurality of polarization-sensitive acquisitions defines at least one pair of acquisitions performed with mutually different but closely-spaced wavelengths and substantially the same state of polarization (SOP), a center of the wavelengths defining a center wavelength for said at least one pair, and wherein said plurality of polarization-sensitive acquisitions comprises a plurality of pairs of acquisitions performed with at least one of a plurality of mutually-different center wavelengths and a plurality of mutually-different states of polarization (SOP); and for each said acquisitions, averaging respective amplitudes of at least part of said repeated reflected light pulses to obtain a value of reflected power;

for each said pairs of said acquisitions, computing a value of a difference, between the two values of reflected powers corresponding to said pair;

computing a mean-square value of the computed values of difference over said at least one of a plurality of mutually-different center wavelengths and a plurality of mutually-different states of polarizations (SOPs); and from said mean-square value, calculating a value of the polarization mode dispersion of said optical fiber under test.

2. The method as claimed in claim 1, wherein said value of reflected power is obtained by averaging respective amplitudes of all of said repeated reflected light pulses.

3. The method as claimed in claim 1, wherein each of said acquisitions comprises the propagation of said first series of repeated light pulses and a second series of repeated light pulses, wherein the second series is propagated before detection of the return light signal of the first series.

4. The method as claimed in claim 1, wherein each acquisitions comprises the propagation of said first series of repeated light pulses and a second series of repeated light pulses, wherein the second series is propagated after detection of the return light signal of the first series.

5. The method as claimed in claim 3, further comprising: normalizing each said value of reflected power before said computing a value of a difference, wherein said normalizing comprises averaging said values of reflected power obtained for said first and said second series of repeated light pulses and dividing each value of reflected power by the average value of reflected power.

6. The method as claimed in claim 3, wherein each said first and second series comprises 4 to 100 light pulses.

7. The method as claimed in claim 1, wherein said computing a value of a difference comprises computing a second-order joint moment of the difference.

8. The method as claimed in claim 1, wherein said averaging respective amplitudes of said repeated reflected light pulses comprises rearranging a timing of each pulse of the series of repeated light pulses in the return light signal and averaging the rearranged return light signal to obtain a value of reflected power.

9. The method as claimed in claim 1, wherein said value of the polarization mode dispersion is calculated as a predetermined function of said mean-square value.

10. The method as claimed in claim 1, wherein said plurality of polarization-sensitive acquisitions comprises a plurality of pairs of acquisitions performed with a plurality of mutually-different center wavelengths and wherein said plurality of mutually-different center wavelengths is obtained by tuning a laser wavelength of said POTDR in steps between acquisitions.

11. The method as claimed in claim 1, wherein said plurality of polarization-sensitive acquisitions comprises a plurality of pairs of acquisitions performed with a plurality of mutually-different center wavelengths and wherein said plurality of mutually-different center wavelengths is obtained by tuning a laser wavelength of said POTDR in continuous.

12. A system for measuring a polarization mode dispersion (PMD) to characterize an optical fiber under test, the system comprising:

a polarization-sensitive Optical Time Domain Reflecto-meter (POTDR) acquisition device connectable toward a proximal end of the optical fiber under test for performing a plurality of polarization-sensitive acqui-sitions toward the optical fiber under test, a distal end of said optical fiber under test being connected to a light reflector, wherein said POTR acquisition device is configured so that:

each acquisition is performed by propagating in the optical fiber under test, a polarized test signal com-prising a first series of repeated light pulses and detecting a corresponding polarization-analyzed return light signal coming back from the optical fiber under test and comprising back-reflected light from the light reflector, said return light signal comprising repeated reflected light pulses, wherein said repeated light pulses are together propagated in the optical fiber under test within a fiber round-trip time, each of said acquisitions is performed with a corre-sponding wavelength of said test signal, said plurality of polarization-sensitive acquisitions defines at least one pair of acquisitions performed with mutually different but closely-spaced wave-lengths and substantially the same state of polariza-tion (SOP), a center of the wavelengths defining a center wavelength for said at least one pair, and said plurality of polarization-sensitive acquisitions comprises a plurality of pairs of acquisitions per-formed with at least one of a plurality of mutually-different center wavelengths and a plurality of mutu-ally-different states of polarization (SOP); and a processing unit receiving acquisition data and config-ured for:

for each said acquisitions, averaging respective ampli-tudes of at least part of said repeated reflected light pulses to obtain a value of reflected power, for each said pairs of said acquisitions, computing a value of a difference, between the two values of reflected powers corresponding to said pair, computing a mean-square value of the computed values of difference over said at least one of a plurality of mutually-different center wavelengths and a plurality of mutually-different states of polarizations (SOPs); and from said mean-square value, calculating a value of the polarization mode dispersion of said optical fiber under test.

13. The system as claimed in claim 12, wherein said POTDR acquisition device comprises:

a light generating assembly comprising a tunable light source and pulse generator and configured to generate said test signal comprising repeated light pulses, at said mutually different wavelengths.

14. The system as claimed in claim 12, wherein said POTDR acquisition device comprises:

a light detecting assembly comprising at least one detector configured to detect said return light signal returning from said optical fiber under test from said test signal for each of said acquisitions.

15. The system as claimed in claim 12, wherein said POTDR acquisition device comprises a polarization-con-troller-and-analyzer unit comprising a polarization discrimi-nator, a polarization controller used to control both an input state of polarization and an analyzer state of polarization.

16. The system as claimed in claim 12, wherein said POTDR acquisition device is configured such that each of said acquisitions comprises the propagation of said first series of repeated light pulses and a second series of repeated light pulses, wherein the second series is propagated after detection of the return light signal of the first series.

17. The system as claimed in claim 12, wherein said POTDR acquisition device is configured such that each acquisitions comprises the propagation of said first series of repeated light pulses and a second series of repeated light pulses, wherein the second series is propagated before detection of the return light signal of the first series.

18. The system as claimed in claim 16, wherein said processing unit is further configured for: normalizing each said value of reflected power before said computing a value of a difference, wherein said normalizing comprises aver-aging said values of reflected power obtained for said first and said second series of repeated light pulses and dividing each value of reflected power by the average value of reflected power.

19. The system as claimed in claim 12, wherein said averaging respective amplitudes of said repeated reflected light pulses comprises rearranging a timing of each pulse of the series of repeated light pulses in the return light signal and averaging the rearranged return light signal to obtain a value of reflected power.

20. The system as claimed in claim 12, wherein said processing unit is configured for calculating said value of the polarization mode dispersion as a predetermined function of said mean-square value.

21. The system as claimed in claim 13, wherein said plurality of polarization-sensitive acquisitions comprises a plurality of pairs of acquisitions performed with a plurality of mutually-different center wavelengths and wherein said tunable light source is configured for tuning a laser wave-length of said POTDR in steps between acquisitions to obtain said plurality of mutually-different center wave-lengths.

22. The system as claimed in claim 13, wherein said plurality of polarization-sensitive acquisitions comprises a plurality of pairs of acquisitions performed with a plurality of mutually-different center wavelengths and wherein said tunable light source is configured for tuning a laser wave-length of said POTDR in continuous between acquisitions to obtain said plurality of mutually-different center wave-lengths.

* * * * *